United States Patent
Seguchi et al.

(10) Patent No.: US 12,371,578 B2
(45) Date of Patent: Jul. 29, 2025

(54) RECORDING METHOD AND INK JET RECORDING APPARATUS

(71) Applicant: Seiko Epson Corporation, Tokyo (JP)

(72) Inventors: Kenichi Seguchi, Okaya (JP); Mitsuaki Kosaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 828 days.

(21) Appl. No.: 17/679,198

(22) Filed: Feb. 24, 2022

(65) Prior Publication Data

US 2022/0275223 A1    Sep. 1, 2022

(30) Foreign Application Priority Data

Feb. 25, 2021 (JP) .................... 2021-028279

(51) Int. Cl.
  *C09D 11/033* (2014.01)
  *B41J 2/135* (2006.01)
  (Continued)

(52) U.S. Cl.
  CPC ............. *C09D 11/033* (2013.01); *B41J 2/135* (2013.01); *B41M 5/0023* (2013.01);
  (Continued)

(58) Field of Classification Search
  CPC ..... B41M 7/009; B41M 5/0023; C09D 11/40; C09D 11/033
  See application file for complete search history.

(56) References Cited

U.S. PATENT DOCUMENTS 10,913,304 B2 *   2/2021   Seguchi ............... B41M 7/0018
2013/0278671 A1 * 10/2013   Ishihara ............... B41J 11/0005
                                                           347/20
(Continued)

FOREIGN PATENT DOCUMENTS

CN       110272658 A       9/2019
CN       114958091 B  *    3/2024    .......... B41J 11/0015
(Continued)

*Primary Examiner* — Sophie Hon
*Assistant Examiner* — Sow-Fun Hon
(74) *Attorney, Agent, or Firm* — Harness, Dickey & Pierce, P.L.C.

(57) ABSTRACT

A recording method includes an adhesion step of ejecting an ink composition from an ink jet head to be adhered to a recording medium; and a primary heating step of heating the adhered ink composition, and the adhesion step includes at least one main scanning in which while a relative position of the ink jet head and the recording medium is changed in a main scanning direction, the ink composition is adhered to the recording medium and at least one sub-scanning in which the relative position of the ink jet head and the recording medium is changed in a sub-scanning direction. In the recording method described above, the number of the main scannings performed on the same recording region of the recording medium is 5 or less, the ink composition is a water-based ink containing a pigment, a resin, and an organic solvent, and in a chart of logarithmic attenuation with temperature obtained by measurement of the ink composition using a rigid-body pendulum characteristics test, the ink composition has a temperature of a first thickening peak of 30° C. to 65° C. and a temperature of a maximum thickening peak of 70° C. or more.

13 Claims, 5 Drawing Sheets

(51) Int. Cl.
*B41M 5/00* (2006.01)
*C09D 11/037* (2014.01)
*C09D 11/10* (2014.01)
*C09D 11/36* (2014.01)
*C09D 11/40* (2014.01)
*B41M 7/00* (2006.01)

(52) U.S. Cl.
CPC ............ *C09D 11/037* (2013.01); *C09D 11/10* (2013.01); *C09D 11/36* (2013.01); *C09D 11/40* (2013.01); *B41J 2202/03* (2013.01); *B41M 7/009* (2013.01)

(56) References Cited

U.S. PATENT DOCUMENTS

2015/0091974 A1* 4/2015 Aoyama ................ B41J 2/2114
347/21
2019/0284425 A1 9/2019 Okuda

FOREIGN PATENT DOCUMENTS

| JP | 2013018127 A | * | 1/2013 | |
|---|---|---|---|---|
| JP | 2017-186534 A | | 10/2017 | |
| JP | 7666014 B2 | * | 4/2025 | .......... B41J 11/0015 |

* cited by examiner

RECORDING METHOD AND INK JET RECORDING APPARATUS

The present application is based on, and claims priority from JP Application Serial Number 2021-028279, filed Feb. 25, 2021, the disclosure of which is hereby incorporated by reference herein in its entirety.

BACKGROUND

1. Technical Field

The present disclosure relates to a recording method and an ink jet recording apparatus.

2. Related Art

Since an ink jet method is able to form a high-quality image on a recording medium, heretofore, various types of technical developments have been carried out. In addition, development of recording apparatuses using an ink jet method has also been aggressively performed. Furthermore, requirements on performances of ink jet compositions used in this apparatus have been widely spread in various fields.

For example, JP-A-2017-186534 has disclosed a water-based ink composition which contains water, an organic solvent, a polysiloxane surfactant, and a polyurethane fixing resin and in which the polysiloxane surfactant has an HLB value of 8 or less, and an amount of dissolved oxygen is controlled in a specific range. The above patent document has also disclosed that when an ink set including the ink as described above is used, a storage stability is excellent, adhesion to various types of substrates is excellent, and even when printing is performed on a non-porous recording medium, a high glossiness can be obtained.

However, in a recording method using an ink jet method, a recording rate was not sufficient in some cases. In particular, the recording rate has not been sufficiently satisfied simultaneously with an excellent image quality.

SUMMARY

According to an aspect of the present disclosure, there is provided a recording method which comprises an adhesion step of ejecting an ink composition from an ink jet head to be adhered to a recording medium and a primary heating step of heating the adhered ink composition. In this recording method, the adhesion step includes at least one main scanning in which while a relative position of the ink jet head and the recording medium is changed in a main scanning direction, the ink composition is adhered to the recording medium and at least one sub-scanning in which the relative position of the ink jet head and the recording medium is changed in a sub-scanning direction, the number of the main scannings performed on the same recording region of the recording medium is 5 or less, the ink composition is a water-based ink containing a pigment, a resin, and an organic solvent, and in a chart of logarithmic attenuation with temperature obtained by measurement of the ink composition using a rigid-body pendulum characteristics test, the ink composition has a temperature of a first thickening peak of 30° C. to 65° C. and a temperature of a maximum thickening peak of 70° C. or more.

According to another aspect of the present disclosure, there is provided an ink jet recording apparatus which performs recording by the recording method described above, the ink jet recording apparatus comprising: an ink composition; an ink jet head to eject the ink composition; and a primary heating mechanism to heat the ink composition adhered to the recording medium. In the ink jet recording apparatus described above, the ink composition is an ink composition containing a pigment, a resin, and an organic solvent, and in a chart of logarithmic attenuation with temperature obtained by measurement of the ink composition using a rigid-body pendulum characteristics test, the ink composition has a temperature of a first thickening peak of 30° C. to 65° C. and a temperature of a maximum thickening peak of 70° C. or more.

DESCRIPTION OF EXEMPLARY EMBODIMENTS

Figure 1:
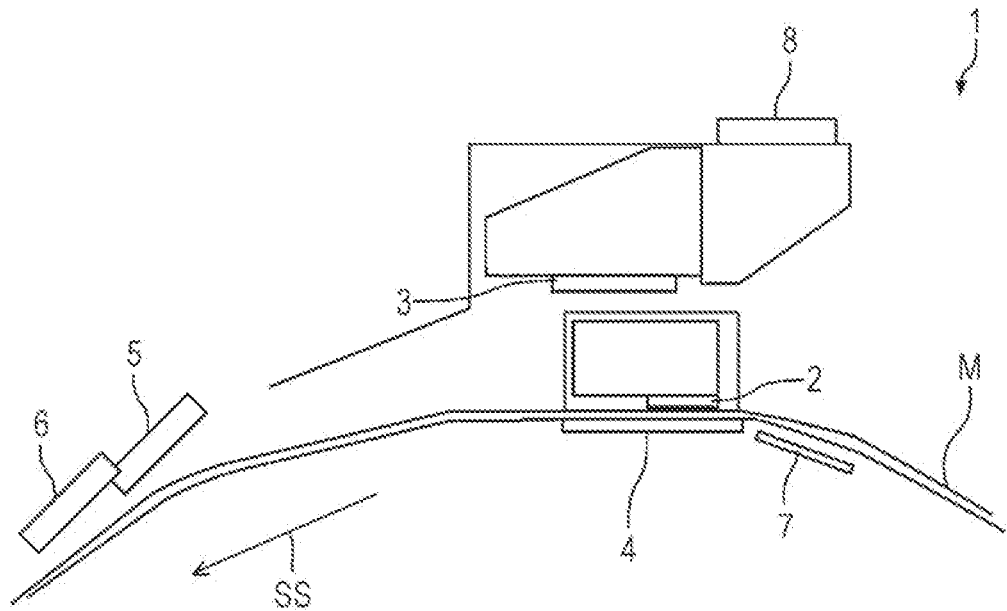
FIG. 1 is a schematic view of one example of an ink jet recording apparatus used in a recording method of an embodiment.

Hereinafter, embodiments of the present disclosure will be described. The following embodiments are used to explain examples of the present disclosure. The present disclosure is not limited to the embodiments described below and also includes various modified embodiments to be performed without departing from the scope of the present disclosure. In addition, all compositions to be described below are not always required to be essential compositions of the present disclosure.

In this specification, "(meth)acryl" indicates acryl or methacryl, and "(meth)acrylate" indicates acrylate or methacrylate.

1. RECORDING METHOD

A recording method according to this embodiment includes a step of ejecting an ink composition from an ink jet head to be adhered to a heated recording medium.

1.1. Ink Composition

The ink composition is a water-based ink containing a pigment, a resin, and an organic solvent, and in a chart of logarithmic attenuation with temperature obtained by measurement of the ink composition using a rigid-body pendulum characteristics test, the ink composition has a temperature of a first thickening peak (hereinafter, referred to as "first thickening peak temperature" in some cases) of 30° C. to 65° C. and a temperature of a maximum thickening peak (hereinafter, referred to as "maximum thickening peak temperature" in some cases) of 70° C. or more. Hereinafter, first, components of the ink composition will be described, and next, for example, physical property tests will be described.

1.1.1. Pigment

The ink composition contains a pigment. As the pigment, for example, an inorganic pigment, such as a carbon black or a titanium white, or an organic pigment may be used. In the ink composition of this embodiment, the pigment may be dispersed by a dispersion resin. The dispersion resin is categorized in the "resin" in this specification and is a resin having a higher water solubility different from a "fixing resin".

As the inorganic pigment, for example, a carbon black (C.I. Pigment Black 7), such as a furnace black, a lamp black, an acetylene black, or a channel black; an iron oxide, a titanium oxide, a zinc oxide, or a silica may be used.

As the carbon black, for example, there may be mentioned No. 2300, 900, MCF88, No. 20B, No. 33, No. 40, No. 45, No. 52, MA7, MA8, MA100, or No2200B each manufactured by Mitsubishi chemical Co., Ltd.; or Color black FW1, FW2, FW2V, FW18, FW200, S150, S160, or S170, Pretex 35, U, V, or 140U, or Special Black 6, 5, 4A, 4, or 250 each manufactured by Degussa AG. In addition, for example, Conductex SC, or Raben 1255, 5750, 5250, 5000, 3500, 1255, or 700 each manufactured by Columbia Carbon Inc. may also be mentioned. Regal 400R, 330R, or 660R, Mogul L, Monarch 700, 800, 880, 900, 1000, 1100, 1300, or 1400, or Elftex 12 each manufactured by Cabot Corporation may also be mentioned by way of example.

As the organic pigment, for example, there may be mentioned a quinacridone-based pigment, a quinacridone-quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment used in the ink composition, the following may be mentioned.

As a cyan pigment, for example, C.I. Pigment Blue 1, 2, 3, 15:3, 15:4, 15:34, 16, 22, or 60; or C.I. Vat Blue 4 or 60 may be mentioned, and for example, one selected from the group consisting of C.I. Pigment Blue 15:3, 15:4, and 60 or a mixture containing at least two types thereof may be preferably mentioned.

As a magenta pigment, for example, C.I. Pigment Red 5, 7, 12, 48 (Ca), 48 (Mn), 57(Ca), 57:1, 112, 122, 123, 168, 184, or 202, or C.I. Pigment Violet 19 may be mentioned, and for example, one selected from the group consisting of C.I. Pigment Red 122, 202, and 209, and C.I. Pigment Violet 19 or a mixture containing at least two types thereof may be preferably mentioned.

As a yellow pigment, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, or 185 may be mentioned, and for example, one selected from the group consisting of C.I. Pigment Yellow 74, 109, 110, 128, and 138 or a mixture containing at least two types thereof may be preferably mentioned.

As an orange pigment, for example, C.I. Pigment Orange 36 or 43 or a mixture thereof may be mentioned. As a pigment used for a green ink, for example, C.I. Pigment green 7 or 36 or a mixture thereof may be mentioned.

The pigments mentioned above by way of example are examples of preferable pigments, and the pigments are not limited thereto. Those pigments may be used alone, or at least two types thereof may be used in combination and may also be used in combination with a dye.

In addition, the pigment may be used after being dispersed using a dispersion resin, a surfactant, or the like. In addition, the pigment may be used as a self-dispersible pigment after being oxidized or sulfonated with ozone, hypochlorite, or fuming sulfuric acid.

In the ink composition of this embodiment, when the pigment is dispersed by a dispersion resin, a ratio of the pigment to the dispersion resin is preferably 10:1 to 1:10 and more preferably 4:1 to 1:3.

In addition, a volume average particle diameter (D50) of the pigment measured by a dynamic light scattering method is preferably 20 to 300 nm, more preferably 30 to 200 nm, and further preferably 40 to 100 nm.

When the volume average particle diameter (D50) of the pigment is the above upper limit or less, in a chart of the logarithmic attenuation with temperature obtained by measurement of the ink composition by a rigid-body pendulum characteristics test which will be described later, a height (logarithmic attenuation) of the first thickening peak tends to be more increased, and hence, when the ink composition is adhered to a recording medium, and the solvent is dried, the flow of the ink composition is likely to be controlled, and for example, blurring and/or bleeding of an image is likely to be suppressed. In addition, in the case in which the volume average particle diameter (D50) of the pigment is the above lower limit or more, when the ink composition is adhered to the recording medium, and the solvent is dried, since contact between pigment particles sufficiently occurs, for example, blurring and/or bleeding of an image can be suppressed. In addition, when the volume average particle diameter (D50) of the pigment is the above lower limit or more, a color developing property of the image is preferably not likely to be degraded.

Although a content of the pigment may be appropriately adjusted in accordance with applications, the content described above is preferably 0.10 to 20.0 percent by mass, more preferably 0.20 to 15.0 percent by mass, even more preferably 1.0 to 10.0 percent by mass, and further preferably 2.0 to 5.0 percent by mass.

1.1.2. Resin

The ink composition used in the recording method of this embodiment contains a resin. Although the resin is not particularly limited, for example, a dispersion resin to disperse the pigment described above in the ink composition or a fixing resin to fix the pigment to a recording medium may be mentioned. At least one of the dispersion resin and the fixing resin is preferably selected. The dispersion resin and the fixing resin may have functions which are partially or totally overlapped with each other. Since the ink composition contains the resin, for example, a dispersibility of the pigment and/or a fixability of the pigment can be improved.

1.1.2.1 Dispersion Resin

The ink composition of this embodiment may contain, as the resin, a dispersion resin to disperse the pigment. The dispersion resin has a function to disperse the pigment described above in the ink composition. The types of dispersion resins are not particularly limited.

In addition, the dispersion resin (also called a "resin dispersant" in some cases) is a high molecular weight material, and as an example thereof, for example, there may be mentioned an acrylic-based resin, such as a poly(meth) acrylic acid, a (meth)acrylic acid-acrylonitrile copolymer, a (meth)acrylic acid-(meth)acrylate copolymer, a vinyl acetate-(meth)acrylate copolymer, a vinyl acetate-(meth) acrylic acid copolymer, or a vinylnaphthalene-(meth)acrylic acid copolymer, or a salt thereof. In addition, for example, there may also be mentioned a styrene-based resin, such as a styrene-(meth)acrylic acid copolymer, a styrene-(meth) acrylate copolymer, a styrene-(meth)acrylic acid-(meth) acrylate copolymer, a styrene-α-methylstyrene-(meth) acrylic acid copolymer, a styrene-α-methylstyrene-(meth) acrylic acid-(meth)acrylate copolymer, a styrene-maleic acid copolymer, or a styrene-maleic anhydride copolymer, or its salt; a cross-linked or non-cross-linked urethane-based resin, such as a liner or branched high molecular weight material (resin) including an urethane bond obtained by a reaction between an isocyanate group and a hydroxy group or its salt; a poly(vinyl alcohol); a vinylnaphthalene-maleic acid copolymer or its salt; a vinyl acetate-maleate copolymer or its salt; or a water-soluble resin, such as a vinyl acetate-crotonic acid copolymer, or its salt.

In addition, the acrylic-based resin or its salt may be, besides the above-described polymer of an acrylic-based monomer, a copolymer between an acrylic-based monomer and another monomer. For example, an acrylic vinyl resin which is a copolymer between an acrylic-based monomer and a vinyl-based monomer as the another monomer may also be mentioned. For example, among the above styrene-based resins, a copolymer between a styrene-based monomer and an acrylic-based monomer is included in the acrylic-based resin.

As a commercially available product of the styrene-based dispersion resin, for example, there may be mentioned X-200, X-1, X-205, X-220, or X-228 (manufactured by Seiko PMC Corporation), Nopcosperse (registered trademark) 6100 or 6110 (manufactured by San Nopco Limited), Joncryl 67, 586, 611, 678, 680, 682, or 819 (manufactured by BASF), DISPERBYK-190 (manufactured by BYK Japan KK), or N-EA137, N-EA157, N-EA167, N-EA177, N-EA197D, N-EA207D, or E-EN10 (manufactured by DKS Co., Ltd.).

In addition, as a commercially available product of the acrylic-based dispersion resin, for example, there may be mentioned BYK-187, BYK-190, BYK-191, BYK-194N, or BYK-199 (manufactured by BYK Japan KK), or Aron A-210, A6114, AS-1100, AS-1800, A-30SL, A-7250, or CL-2 (manufactured by Toagosei Company, Limited).

Furthermore, as a commercially available product of the urethane-based dispersion resin, for example, there may be mentioned BYK-182, BYK-183, BYK-184, or BYK-185 (manufactured by BYK Japan KK), TEGO Disperse 710 (manufactured by Evonic Tego Chemi), or Borchi (registered trademark) Gen 1350 (manufactured by OMG Borschers).

The dispersion resin may be used alone, or at least two types thereof may be used in combination. A total content of the dispersion resin with respect to 100 percent by mass of the ink is 0.1 to 30 percent by mass, preferably 0.5 to 25 percent by mass, more preferably 1 to 20 percent by mass, and further preferably 1.5 to 15 percent by mass. Since the content of the dispersion resin is 0.1 percent by mass or more, a dispersion stability of the pigment can be secured. In addition, when the content of the dispersion resin is 30 percent by mass or less, a viscosity of the ink composition can be controlled to be low.

In addition, a weight average molecular weight of the dispersion resin is more preferably 500 or more. Since the dispersion resin as described above is used, an odor thereof is suppressed, and the dispersion stability of the pigment can be further improved.

A glass transition temperature (Tg) of the dispersion resin is preferably 40° C. or more, more preferably 70° C. or more, and further preferably 90° C. or more. On the other hand, the Tg is preferably 120° C. or less, more preferably 110° C. or less, and further preferably 100° C. or less.

1.1.2.2 Fixing Resin

The ink composition used in the recording method according to this embodiment may contain a fixing resin as the resin. The fixing resin has a function to improve adhesion of a component of the ink composition adhered to the recording medium. As the fixing resin described above, for example, there may be mentioned a fixing resin formed from an urethane-based resin, an acrylic-based resin (including a styrene-acrylic-based resin), a fluorene-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, or an ethylene-vinyl acetate-based resin. Those fixing resins may be in the form of particles, and although being frequently handled in the form of emulsion, the fixing resin may also be in the form of powder. In addition, the fixing resin may be used alone, or at least two types thereof may be used in combination.

The urethane-based resin is a generic name of a resin having an urethane bond. As the urethane-based resin, for example, there may be used a polyether-type urethane resin which includes besides the urethane bond, an ether bond in its main chain, a polyester-type urethane resin which includes, besides the urethane bond, an ester bond in its main chain, or a polycarbonate-type urethane resin which includes, besides the urethane bond, a carbonate bond in its main chain. As the urethane-based resin used as the fixing resin, a commercially available product may also be used, and for example, there may be used Superflex 460, 460s, 840, or E-4000 (trade name, manufactured by DKS Co., Ltd.), Resamine D-1060, D-2020, D-4080, D-4200, D-6300, or D-6455 (trade name, manufactured by Dainichiseika Color & Chemicals Mfg. Co., Ltd.), Takelac WS-6021 or W-512-A-6 (trade name, manufactured by Mitsui Chemicals Polyurethanes Inc.), Suncure 2710 (trade name, manufactured by Lubrizol), or Permarine UA-150 (trade name, manufactured by Sanyo Chemical Industries, Ltd.).

The acrylic-based resin is a generic name of a polymer obtained by polymerization using as one component, an acrylic-based monomer, such as (meth)acrylic acid or a (meth)acrylate, and for example, a resin obtained from an acrylic-based monomer or a copolymer obtained from an acrylic-based monomer and another monomer may be mentioned. For example, an acryl-vinyl-based resin which is a copolymer between an acrylic-based monomer and a vinyl-based monomer may be mentioned. Furthermore, for example, a copolymer with a vinyl-based monomer such as styrene may also be mentioned.

As the acrylic-based monomer, for example, acrylamide or acrylonitrile may also be used. As the fixing resin using an acrylic-based resin as a raw material, a commercially available product may also be used, and for example, FK-854 (trade name, manufactured by Chuo Rika Kogyo), Movinyl 952B or 718A (trade name, manufactured by Nippon Synthetic Chemical Industry Co., Ltd.), or Nipol LX852 or LX874 (trade name, manufactured by Zeon Corporation) may be used.

In particular, the styrene-acrylic-based resin is a copolymer obtained from a styrene monomer and an acrylic-based monomer, and for example, there may be mentioned a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer. As the styrene-acrylic-based resin used as the fixing resin, a commercially available product may also be used, and for example, there may be used Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF), Movinyl 966A or 975N (trade name, manufactured by Nippon Synthetic Chemical Industry Co., Ltd.), or Vinyblan 2586 (manufactured by Nisshin Chemical Industry Co., Ltd.).

The olefin-based resin has a structure derived from an olefin, such as ethylene, propylene, or butylene, and a known olefin-based resin may be appropriately selected. As the fixing resin of the olefin-based resin, a commercially available product may be used, and for example, Arrowbase CB-1200 or CD-1200 (trade name, Unitika Ltd.) may be used.

As other examples of commercially available emulsions of the fixing resin, for example, there may be mentioned Microgel E-1002 and E-5002 (trade name, styrene-acrylic-based resin emulsion, manufactured by Nippon Paint Co., Ltd.); Boncoat 4001 (trade name, acrylic-based resin emulsion, manufactured by DIC Corporation); Boncoat 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene-vinyl acetate resin emulsion), and Polysol PSASE-6010 (ethylene-vinyl acetate resin emulsion) (trade names, manufactured by Showa Denko K.K.); Polysol SAE1014 (trade name, styrene-acrylic-based resin emulsion, manufactured by Zeon Corporation); Saibinol SK-200 (trade name, acrylic-based resin emulsion, manufactured by Saiden Chemical Industry Co., Ltd.); AE-120A (trade name, acrylic-based resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade names, manufactured by Nisshin Chemical Industry Co., Ltd.): Elitel KA-5071S, KT-8803, KT-9204, KT-8701, KT-8904, and KT-0507 (trade names, polyester resin emulsion, manufactured by Unitika Ltd.); Hi-Tech SN-2002 (trade name, polyester resin emulsion, manufactured by Toho Chemical Industry Co., Ltd.); Takelac W-6020, W-635, W-6061, W-605, and W-6021 (trade names, urethane-based resin emulsion, manufactured by Mitsui Chemicals Polyurethanes Inc.); Superflex 870, 800, 150, 420, 460, 470, 610, and 700 (trade names, urethane-based resin emulsion, manufactured by DKS Co., Ltd.); Permarine UA-150 (trade name, urethane-based resin emulsion, manufactured by Sanyo Chemical Industries, Ltd.); Suncure 2710 (urethane-based resin emulsion, manufactured by Nippon Librizol); NeoRez R-9660, R-9637, and R-940 (urethane-based resin emulsion, manufactured by Kusumoto Chemicals, Ltd.); ADEKA BONTIGHER HUX-380 and 290K (urethane-based resin emulsion, manufactured by ADEKA Corporation); Movinyl 966A and Movinyl 7320 (manufactured by Nippon Synthetic Chemical Industry Co., Ltd.); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF); NK Binder R-5HN (manufactured by Shin-Nakamura Chemical Co., Ltd.); Hydran WLS-210 (non-crosslinked polyurethane, manufactured by DIC Corporation); and Joncryl 7610 (manufactured by BASF).

When the fixing resin is contained in the ink composition, a content thereof with respect to a total mass of the ink composition is, as a solid content, preferably 10 percent by mass or less, more preferably 7 percent by mass or less, and further preferably 5 percent by mass or less. Accordingly, an image having a sufficient friction fastness can be recorded.

When the ink composition contains the fixing resin as the resin, a glass transition temperature (Tg) of the fixing resin is preferably 40° C. or more, more preferably 50° C. or more, and further preferably 55° C. or more. On the other hand, the Tg described above is preferably 100° C. or less, more preferably 90° C. or less, and further preferably 80° C. or less.

When the glass transition temperature is higher, a temperature of the maximum thickening peak obtained in the rigid-body pendulum characteristics test tends to be higher. When the glass transition temperature is in the range described above, an image having a more preferable friction fastness can be preferably recorded. The glass transition temperature can be confirmed by a differential scanning calorimetry (DSC).

In addition, when the ink composition contains, as the resin, a fixing resin in the form of particles, a volume average particle diameter of the particles of the fixing resin is preferably 200 nm or less, more preferably 150 nm or less, and further preferably 100 nm or less. As the volume average particle diameter is smaller, the logarithmic attenuations of the first thickening peak and the maximum thickening peak obtained in the rigid-body pendulum characteristics test each tend to be increased. When the volume average particle diameter is in the range described above, recording can be preferably performed with a more excellent ejection stability.

The volume average particle diameter described above may be confirmed in a manner similar to that of the pigment.

1.1.3. Organic Solvent

The ink composition used in the ink jet recording method according to this embodiment contains an organic solvent. The organic solvent is preferably a water-soluble organic solvent. As a function of the organic solvent, for example, a function to improve a wettability of the ink composition to a recording medium and/or a function to enhance a moisture retaining property of the ink composition may be mentioned. As the organic solvent, for example, there may be mentioned an ester, an alkylene glycol ether, a cyclic ester, a nitrogen-containing solvent, or a polyvalent alcohol. As the nitrogen-containing solvent, for example, a cyclic amide or a non-cyclic amide may be mentioned. As the non-cyclic amide, for example, an alkoxyalkyl amide may be mentioned.

The organic solvent contained in the ink composition has a boiling point of preferably 280.0° C. or less, more preferably 160.0° C. to 270.0° C., even more preferably 180.0° C. to 260.0° C., and further preferably 200.0° C. to 250.0° C. When the organic solvent as described above is selected, for example, an abrasion resistance and the ejection stability are preferably likely to be further improved.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxy butyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, or dipropylene glycol acetate propionate.

As the alkylene glycol ether, a monoether or a diether of an alkylene glycol may be used, and an alkyl ether is preferable. As a particular example, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

In addition, when the fixing resin is contained in a treatment liquid or the ink composition, the fixing resin tends to be easily dissolved or swelled in a diether of the alkylene glycol described above as compared to in a monoether thereof, and the abrasion resistance of an image to be formed more preferably tends to be further improved. On the other hand, the monoether is preferable since the wettability of the ink composition is more improved.

As the cyclic ester, for example, there may be mentioned a cyclic ester (a lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone, or a compound in which a hydrogen of a methylene group adjacent to a carbonyl group thereof is substituted by an alkyl group having 1 to 4 carbon atoms.

The cyclic amide is a nitrogen-containing solvent, a lactam may be mentioned as an example thereof, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone. Those are preferable since film formation of the fixing resin is promoted, and in particular, 2-pyrrolidone is more preferable.

In addition, as the alkoxyalkyl amide of the non-cyclic amide of the nitrogen-containing solvent, a compound represented by the following general formula (1) is preferably used.

$$R^1\text{—}O\text{—}CH_2CH_2\text{—}(C{=}O)\text{—}NR^2R^3 \tag{1}$$

$R^1$ in the above formula (1) represents an alkyl group having 1 to 4 carbon atoms, and $R^2$ and $R^3$ each independently represent a methyl group or an ethyl group. The "alkyl group having 1 to 4 carbon atoms" may be a linear or branched alkyl group, and for example, a methyl group, an ethyl group, an n-propyl group, an iso-propyl group, an n-butyl group, a sec-butyl group, an iso-butyl group, or a tert-butyl group may be mentioned. The compound represented by the above formula (1) may be used alone, or at least two types thereof may be used in combination.

As a function of the compound represented by the formula (1), for example, a function to enhance a surface drying property and a fixing property of the ink composition adhered to a low-absorbing recording medium. In particular, the compound represented by the formula (1) has an excellent function to appropriately soften and/or dissolve a vinyl chloride-based resin. Hence, the compound represented by the above formula (1) softens and/or dissolves a recording surface of a recording medium containing a vinyl chloride-based resin, and hence, the ink composition is allowed to permeate the recording medium. Since the ink composition permeates the recording medium as described above, a component of the ink composition is tightly fixed, and the surface of the ink composition is more likely to be dried. Hence, an image thus obtained is likely to have more excellent surface drying property and fixing property.

In addition, in the above formula (1), $R^1$ more preferably represents a methyl group having one carbon atom. In the above formula (1), a standard boiling point of a compound in which $R^1$ represents a methyl group is low as compared to that of a compound in which $R_1$ represents an alkyl group having 2 to 4 carbon atoms. Hence, in the above formula (1), when a compound in which $R_1$ represents a methyl group is used, a surface drying property of an adhesion region may be further improved in some cases.

When the non-cyclic amide is used, although a content thereof with respect to the total mass of the ink composition is not particularly limited, the content described above is approximately 5 to 50 percent by mass and preferably 8 to 48 percent by mass. When the content of the non-cyclic amide is in the range described above, the fixing property and the surface drying property of an image may be further improved in some cases.

As a concrete example of the alkoxyalkyl amide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

A total content of the nitrogen-containing solvent with respect to a total mass of the ink composition is preferably 40.0 percent by mass or less, more preferably 30.0 percent by mass or less, even more preferably 20.0 percent by mass or less, further preferably 15.0 percent by mass or less, even further preferably 13.0 percent by mass or less, particularly preferably 10.0 percent by mass or less, and even particularly preferably 5 percent by mass or less. In particular, the nitrogen-containing solvent is preferably not contained in an amount of more than 5.0 percent by mass. In the case described above, a clogging resistance and an image quality are further improved, the image can be easily dried, and the abrasion resistance of a recorded matter obtained after recording can be further improved. In this case, "not contained in an amount of more than X percent by mass" indicates that the content is X percent by mass or less and that as long as the content is not more than X percent by mass, the solvent may be either contained or not contained.

In addition, the content of the nitrogen-containing solvent in the ink composition may be 0 percent by mass or more and is preferably 1 percent by mass or more, more preferably 3 percent by mass or more, and further preferably 6 percent by mass or more. In this case, for example, the ejection stability is preferably further improved. Accordingly, while the ejection stability of the ink composition is improved, a wet abrasion resistance of an image can be improved.

The polyvalent alcohol is an alkane derivative having at least two hydroxy groups and may also have a condensed structure by intermolecular hydroxy groups. As a concrete example of the polyvalent alcohol, for example, there may be mentioned a 1,2-alkanediol (an alkanediol, such as ethylene glycol, propylene glycol (alias: propane-1,2-diol), 1,2-butanediol, 1,2-pentanediol, 1,2-hexanediol, 1,2-heptanediol, or 1,2-octanediol) or a polyvalent alcohol (a polyol) excluding a 1,2-alkanediol (such as diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, or glycerin).

As the polyvalent alcohol, for example, an alkanediol or a polyol may be mentioned. As a more preferable alkanediol, a diol of an alkane having 5 carbon atoms or more may be mentioned. The number of carbon atoms of the alkane mentioned above is preferably 5 to 15, more preferably 6 to 10, and further preferably 6 to 8.

As the polyol, for example, an alkane derivative having at least two hydroxy groups or an alkylene ether having 4 carbon atoms or less and at least two hydroxy groups may be mentioned. The number of carbon atoms of the alkane derivative is preferably 5 or less and more preferably 4 or less. In addition, the number of carbon atoms of the alkylene portion of the alkylene ether is preferably 4 or less and more preferably 2 or 3. The number of hydroxy groups in the molecule of the polyol is preferably 10 or less and more preferably 5 or less. In addition, when the polyol has an alkylene ether structure, the number of ether bonds is preferably 1 to 4 and more preferably 1 to 3.

A content of the polyalcohol in the ink is preferably 2 to 40 percent by mass, more preferably 5 to 30 percent by mass, and further preferably 8 to 20 percent by mass.

The alkanediol and the polyol both are able to primarily function as a penetrating solvent and/or a moisture retaining solvent. The polyol strongly tends to have a function as a moisture retaining solvent. Among the alkanediols, some alkanediols have a strong property as a penetrating solvent and some alkanediols have a strong property as a moisture retaining solvent. Among the alkanediols, a 1,2-alkanediol strongly tends to function as a penetrating solvent, and an alkanediol other than a 1,2-alkanediol strongly tends to function as a moisture retaining solvent.

The ink composition more preferably contains a 1,2-alkanediol having 4 carbon atoms or less and an alkanediol which has 8 carbon atoms or less and which is other than a 1,2-alkanediol. The 1,2-alkanediol having 4 carbon atoms or less is one type of polyol. The alkanediol which has 8 carbon atoms or less and which is other than a 1,2-alkanediol may be either an alkanediol or a polyol. While having an excellent moisture retaining property, the 1,2-alkanediol having 4 carbon atoms or less tends to have an excellent wet abrasion resistance. The alkanediol which has 8 carbon atoms or less and which is other than a 1,2-alkanediol tends to have a particularly excellent moisture retaining property.

As the 1,2-alkanediol having 4 carbon atoms or less, for example, ethylene glycol, 1,2-propanediol, or 1,2-butanediol may be mentioned. As the alkanediol which has 8 carbon atoms or less and which is other than a 1,2-alkanediol, for example, 1,3-propanediol, 1,3-butanediol, 1,4-butanediol, 1,5-pentanediol, 1,6-hexanediol, or 1,8-octanediol may be mentioned. Accordingly, while the ejection stability of the ink composition is improved, the wet abrasion resistance of an image can be further improved.

A content of the 1,2-alkanediol having 4 carbon atoms or less with respect to the total mass of the ink is preferably 1 to 20 percent by mass, more preferably 5 to 17 percent by mass, and further preferably 8 to 15 percent by mass. A content of the alkanediol which has 8 carbon atoms or less and which is other than a 1,2-alkanediol with respect to the total mass of the ink is preferably 1 to 20 percent by mass, more preferably 2 to 15 percent by mass, and further preferably 3 to 8 percent by mass.

A ratio (mass ratio) of the content of the 1,2-alkanediol having 4 carbon atoms or less to the content of the alkanediol which has 8 carbon atoms or less and which is other than a 1,2-alkanediol is preferably 0.2 to 3, more preferably more than 0.5 to 2.5, even more preferably 1 to 2, further preferably more than 1 to 1.5, and particularly preferably 1.2 to 1.8. In this case, the same advantages as described above are preferably obtained.

In the ink composition, the organic solvent described above may be used alone, or at least two types thereof may be used in combination.

In addition, a total content of the organic solvent with respect to the total mass of the ink composition is preferably 40 percent by mass or less. On the other hand, the total content described above is preferably 5 percent by mass or more, more preferably 5 to 40 percent by mass, even more preferably 10 to 35 percent by mass, and further preferably 15 to 30 percent by mass. In particular, when the total content of the organic solvent with respect to the total mass of the ink composition is 30 percent by mass or less, while the ejection stability of the ink composition is improved, the wet abrasion resistance of an image can be preferably improved.

1.1.4. Other Components

The ink composition used in the recording method according to this embodiment may contain, besides the components described above, water, a dye, a dispersant, a surfactant, an additive, and other components.

1 Water

The ink composition may contain water. The ink composition is preferably a water-based composition. The water-based composition indicates a composition containing water as one primary solvent component. Water may be contained as a primary solvent component and is a component to be evaporated by drying. As the water, for example, pure water, such as ion-exchange water, ultrafiltration water, reverse osmosis water, or distilled water, or water, such as ultrapure water, in which ionic impurities are removed as much as possible is preferable. In addition, in the case in which water sterilized by UV radiation or addition of hydrogen peroxide is used, generation of fungi and bacteria can be preferably suppressed when the treatment liquid or the ink composition is stored for a long time. A content of the water with respect to the total mass of the ink composition is preferably 40 percent by mass or more, more preferably 45 percent by mass or more, even more preferably 50 to 98 percent by mass, and further preferably 55 to 95 percent by mass.

2 Dye

The ink composition may contain a dye. As the dye, an acidic dye, a direct dye, a reactive dye, or a basic dye may be mentioned as a water-soluble dye, and as a water-dispersible dye, a dispersible dye, an oil soluble dye or a sublimation dye may be mentioned.

3 Dispersant

The ink composition may contain a dispersant. As the dispersant, for example, an anionic-based dispersant or a nonionic-based dispersant may be mentioned.

As the anionic-based dispersant, for example, a formalin condensate of an aromatic sulfonic acid may be preferably mentioned. As the "aromatic sulfonic acid" in the formalin condensate of an aromatic sulfonic acid, for example, there may be mentioned creosol oil sulfonic acid, cresol sulfonic acid, phenol sulfonic acid, β-naphthol sulfonic acid, an alkylnaphthalene sulfonic acid, such as methylnaphthalene sulfonic acid or butylnaphthalene sulfonic acid, a mixture of β-naphthalene sulfonic acid and β-naphthol sulfonic acid, a mixture of cresol sulfonic acid and 2-naphthol-6-sulfonic acid, a lignin sulfonic acid, or a salt of one of those mentioned above.

Among those mentioned above, as a commercially available product of a naphthalene sulfonic acid-based dispersant, for example, there may be mentioned Demol NL (naphthalene sulfonic acid derivative), Demol MS, Demol N, Demol RN, Demol RN-L, Demol SC-30, Demol SN-B, Demol SS-L, Demol T, or Demol T-45 (each manufactured by Kao Corporation).

In addition, as the anionic-based dispersant, for example, a formalin condensate of β-naphthalene sulfonic acid, a formalin condensate of an alkylnaphthalene sulfonic acid, a formalin condensate of creosote oil sulfonic acid, or a salt one of those mentioned above is preferable, and in particular, a sodium salt thereof is more preferable.

As the nonionic dispersant, for example, an ethylene oxide adduct of phytosterol or an ethylene adduct of cholestanol may be mentioned.

4 Surfactant

The ink composition may contain a surfactant. The surfactant has a function to decrease a surface tension of the ink composition so as to improve a wettability thereof to a recording medium or an underlayer. Among the surfactants, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound may be preferably mentioned. Although the polysiloxane-based compound is not particularly limited, for example, a polyether modified organosiloxane may be mentioned. As a commercially available product of this polyether modified organosiloxane, for example, there may be mentioned BYK-306, BYK-307, BYK-333, BYK-341, BYK-345, BYK-346, or BYK-348 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, a fluorine modified polymer is preferably used, and in particular, for example, there may be mentioned BYK-3440 (manufactured by BYK Japan KK); Surflon S-241, S-242, or S-243 (trade name, manufactured by AGC SEIMI CHEMICAL CO., LTD.); or Ftergent 215M (manufactured by Neos Co., Ltd.).

When the surfactant is contained in the ink composition, a plurality of surfactants may be contained. A content of the surfactant contained in the ink composition with respect to the total mass thereof is preferably 0.1 to 2.0 percent by mass, more preferably 0.2 to 1.5 percent by mass, and more preferably 0.3 to 1.0 percent by mass.

5 Additive

The ink composition may contain as the additive, for example, an urea, an amine, and/or a saccharoid. As the urea, for example, urea, ethyleneurea, tetramethylurea, thiourea, or 1,3-dimethyl-2-imidazolidinone may be mentioned, and a betaine (such as trimethylglycine, triethylglycine, tripropylglycine, triisopropylglycine, N,N,N-trimethylalanine, N,N, N-triethylalanine, N,N,N-triisopropylalanine, N,N,N-trimethylmethylalanine, carnitine, or acetylcarnitine) may also be mentioned.

As the amine, for example, diethanolamine, triethanolamine, or triisopropanolamine may be mentioned. The urea and the amine each may be used to function as a pH adjuster.

As the saccharoid, for example, there may be mentioned glucose, mannose, fructose, ribose, xylose, arabinose, galactose, aldonic acid, glucitol (sorbit), maltose, cellobiose, lactose, sucrose, trehalose, or maltotriose.

6 Wax

The ink composition may contain a wax. Since having a function to impart lubricity to an image formed by the ink composition, for example, the wax can suppress peeling of the image. As a component to form the wax, for example, there may be mentioned a plant/animal wax, such as a carnauba wax, a candelilla wax, a beeswax, a rice wax, or a lanolin; a petroleum-based wax, such as a paraffin wax, a microcrystalline wax, a polyethylene wax, an oxidized polyethylene wax, or a petrolatum; a mineral-based wax, such as a montan wax or an ozokerite: a synthetic wax, such as a carbon wax, a Hoechst wax, a polyolefin wax, or a stearic acid amide; a natural/artificial wax emulsion, such as an α-olefin/maleic anhydride copolymer; or a blended wax, and those waxes mentioned above may be used alone, or at least two types thereof may be used in combination.

As the wax, a commercially available product may be used without any modification, and for example, Nopcoat PEM-17 (trade name, manufactured by San Nopco Limited), Chemipearl W4005 (trade name, manufactured by Mitsui Chemicals Inc.), or AQUACER 515, 539, or 593 (trade name, manufactured by BYK Japan KK) may be mentioned.

7 Others

The ink composition used in the ink jet recording method according to this embodiment may further contain, if needed, components, such as an antiseptic agent/fungicide, an anti-rust agent, a chelating agent, a viscosity adjuster, an antioxidant, and/or an antifungal agent.

1.2. Physical Property of Ink Composition

In a chart of the logarithmic attenuation with temperature obtained by measurement of the ink composition using a rigid-body pendulum characteristics test, the ink composition used in the recording method of this embodiment has a first thickening peak temperature of 30° C. to 65° C. and a maximum thickening peak temperature of 70° C. or more.

In a drying process of the ink composition, various physical properties of the ink composition are changed. The changes in physical properties of the ink composition in the drying process thereof are generated in association with many phenomena, such as drying, thickening, and solidification of the ink composition; precipitation of the solute; aggregation of the pigment; and aggregation of the resin, which are complicatedly related to each other with time. Hence, it is difficult to independently evaluate the individual phenomena described above, and even if some of the phenomena are accurately observed, the physical properties of the whole ink composition are difficult to evaluate due to the other phenomena involved therein.

In this embodiment, the physical properties of the ink composition are evaluated using a rigid-body pendulum characteristics test. The rigid-body pendulum characteristics test is a test performed in accordance with ISO 12013-1 and ISO 12013-2. In the rigid-body pendulum characteristics test, the individual phenomena, such as the drying, the thickening, and the solidification of the ink composition and the precipitation of the solute, are not independently evaluated, but comprehensive and macroscopic physical properties of the ink composition can be evaluated. As the data obtained by the rigid-body pendulum characteristics test, for example, the logarithmic attenuation of amplitude of the pendulum and the change in oscillation period of the pendulum with time may be mentioned. In addition, as an apparatus to perform the rigid-body pendulum characteristics test in accordance with ISO 12013-1 and ISO 12013-2, for example, a rigid-body pendulum characteristics tester "RPT-3000W" manufactured by "A&D Company, Limited" may be mentioned.

Various types of investigations have been carried out by the present inventor, and it was found that the change in oscillation period of the pendulum obtained by a rigid-body pendulum characteristics test under specific conditions can sensitively evaluate the characteristics of the ink composition used in the ink jet recording method of this embodiment. In addition, it was found that the change in oscillation period of the pendulum has a preferable relationship with the ejection stability of the ink composition and the abrasion resistance of an image. In addition, it was also found that compared to the relationship between the composition, such as the type and the concentration of each component, of the ink composition and the ejection stability and the abrasion resistance, the relationship between the change in oscillation period of the pendulum with time and the ejection stability and the abrasion resistance is strong. The present inventor considered that multiple behavior including the drying of the solvent, the aggregation of the pigment, the softening of the resin, the film formation of the resin, the solidification of the ink composition, and the like is represented by the oscillation period of the rigid-body pendulum.

In particular, "RPT-3000W" is used for the rigid-body pendulum characteristics test, "FRB-100 (manufactured by A&D Company, Limited)" is used as a rigid-body pendulum frame, and as a measuring portion shape, "RBPO20" is used. On the frame, 4 spacers (2.7 g/spacer) are disposed, and when the pendulum is swung at an angle of 0.3°, the change in free oscillation of the pendulum is measured while the temperature is increased. At ordinary temperature and ordinary humidity (at 22.0° C. to 25.0° C. and preferably 22.0° C. to 24.0° C. and at 35.0% RH to 60.0% RH and preferably 40.0% RH to 55.0% RH), the ink composition is dripped in an amount of 4 µL on a glass plate (24 mm×40 mm) (manufactured by Matsunami Glass Ind., Ltd.) to be used as a test sample. In addition, the measurement is performed under the conditions in which CHB-100 is used as a sample mount, a measurement interval is 6 seconds, a pendulum adsorption interval is 2 seconds, the temperature is increased from 30° C. to 170° C. at a rate of 2° C./minute, and a temperature increase time from ordinary temperature to 30° C. is 1 minute. In addition, the displacement of the pendulum is measured by continuously measuring a front end of the pendulum using a displacement sensor.

Figure 6:
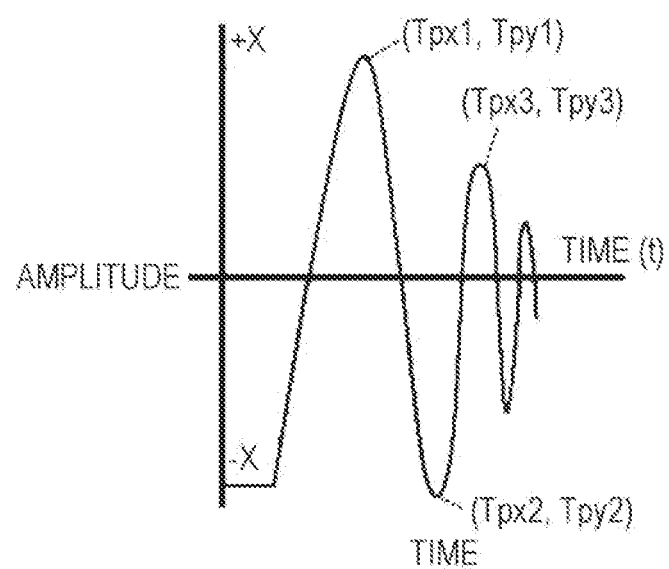
FIG. 6 is a schematic view showing one example of a relationship between amplitude and time in the recording method of the embodiment.

FIG. 6 is a schematic view showing a relationship between the change in measured amplitude and the logarithmic attenuation. The oscillation period (T) and the logarithmic attenuation (Δ) are obtained by the following equations.

$$\text{Oscillation period}(T) = (Tpx3 - Tpx1)$$

$$T_{pyav} = (Tpy1 + 2 \times Tpy2 + Tpy3)/4$$

$$Y_r = (Tpy3 - Tpyav)/(Tpy1 - Tpyav)$$

$$\Delta = -\ln(Yr)$$

The ink composition is measured as described above, so that a chart of the logarithmic attenuation with temperature is obtained. In the case described above, the logarithmic attenuation is a logarithm value of the attenuation of the pendulum amplitude and has no dimension. The logarithmic attenuation along the vertical axis relates to the viscosity of the ink composition, and when the logarithmic attenuation is large, the viscosity described above tends to be high. Since the ink composition used in the recording method of this embodiment has the composition described above, in the chart of the logarithmic attenuation with temperature, a plurality of peaks are observed. The peak is a peak of a mountain like curve in which the logarithmic attenuation calculated every 6 seconds is continuously increased and then continuously decreased, that is, the peak represents an inflection point at which the continuous increase of the logarithmic attenuation stops and at which neither increase nor decrease thereof occurs.

Figure 7:
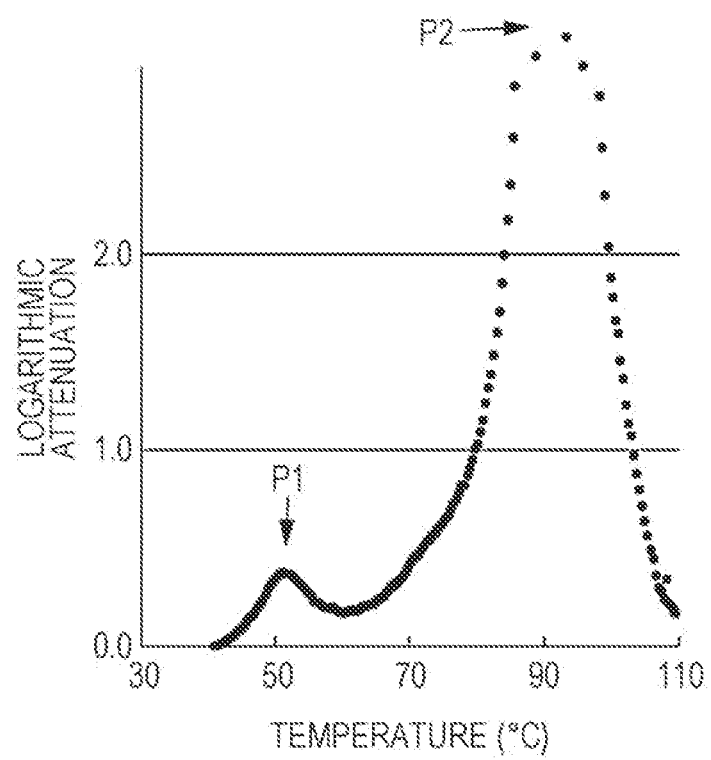
FIG. 7 is a schematic view showing one example of logarithmic attenuation with temperature in the recording method of the embodiment.

FIG. 7 is a schematic view showing one example of the chart of the logarithmic attenuation with temperature thus obtained. In the example shown in FIG. 7, the first thickening peak is located at a position P1, and the maximum thickening peak is located at a position P2.

In addition, the test described above is performed 3 times under the same conditions, and the measurement values of the logarithmic attenuation and the temperature of each peak are each obtained as the average value.

In this specification, in a temperature increase range of 30° C. to 65° C., the maximum value of the curve (logarithmic attenuation) of the chart is regarded as the first thickening peak, and the temperature and the height thereof are measured. However, when the maximum value of the logarithmic attenuation is represented by 100%, and when the minimum value observed after the decrease is decreased by 5% or more thereof, the maximum value is regarded as the peak. The chart of the logarithmic attenuation with temperature is assumed to be continuous, and a discontinuous measurement point is excluded as the measurement error. In addition, when a plurality of peaks is observed in the range of 30° C. to 65° C., a peak at the lowest temperature is regarded as the first thickening peak. On the other hand, a peak having the maximum logarithmic attenuation is regarded as the maximum thickening peak. Although a discontinuous chart is liable to be formed at a high temperature side, regardless of this case, the maximum thickening peak is determined.

The present inventor considers or believes that the meanings of the first thickening peak and the maximum thickening peak are as described below.

The temperature of the first thickening peak indicates a temperature at which particles of the resin or the pigment (covered with the dispersion resin) are gathered and the thickening thereof is finished. When the temperature is further increased from this temperature, by the temperature increase, the gathering of the particles may be loosened, or by the temperature increase, the decrease in viscosity occurs, and the logarithmic attenuation is decreased.

The height of the first thickening peak indicates the degree of the thickening when the particles are gathered. The height described above depends on the characteristics of the resin forming the particles and the characteristics thereof when the resin is swelled by the solvent. When the particle diameter of the pigment or the resin is small, the viscosity increase is large when the particles are gathered, and hence, the height of the first thickening peak tends to be increased.

The temperature of the maximum thickening peak indicates a temperature at which dissolution of the resin forming the particles is completed. The temperature described above is also considered to relate to an inherent dissolution temperature of the resin and the dissolution of the resin by the solvent. As the glass transition temperature (Tg) of the resin is decreased, the temperature of the maximum thickening peak also tends to be decreased.

The height of the maximum thickening peak is considered to relate to a phenomenon in which molecular chains are entangled with each other. The phenomenon described above is believed to occur such that when the resin starts to be dissolved or melted, the component of the resin is transferred in the solvent, and hence, an apparent molecular weight of the resin in the solvent is increased. When this temperature is further increased, since the entanglement described above is loosened and released by heat, the logarithmic attenuation is to be decreased at a high temperature side. Furthermore, when the solid content only remains after the evaporation of the solvent component, the resistance against the motion of the pendulum is decreased, and hence, the logarithmic attenuation is decreased.

Although relating to the interaction between the resin and the solvent, the temperature and the height (logarithmic attenuation) of the maximum thickening peak also relate to an inherent solubility of the resin. For example, the temperature and the height described above also depend on whether the resin has a three-dimensional steric structure or a linear structure. In addition, the temperature and the height described above also relate to, for example, whether the solvent has a three-dimensional steric structure or a linear structure. For example, when the resin is in the form of particles, and when the particle diameter thereof is small, the dissolution of the resin rapidly occurs, and hence, the height of the maximum thickening peak may be increased in some cases.

In the ink composition used in the ink jet recording method according to this embodiment, although the temperature of the first thickening peak is 30° C. to 65° C., the temperature described above is preferably 35° C. to 60° C., more preferably 40° C. to 55° C., and further preferably 40° C. to 50° C. Accordingly, an image having a higher image quality can be recorded at a higher rate. In addition, the ejection stability is also improved. The temperature of the first thickening peak can be controlled to be high by increasing the difference in SP value between the organic solvent and the resin contained in the ink and can also be controlled to be low by decreasing the difference described above. The reason for this is that when the above difference is small, a temperature at which the resin is swelled by the organic solvent is decreased. The SP value is an SP value defined by Hansen Method. The SP value of the organic solvent is a weight average SP value obtained such that SP values of organic solvents contained in the ink are weight averaged based on the masses thereof assuming that the total of all the organic solvents contained in the ink is 100 parts by mass. The SP value of the resin is also obtained by the same method as described above.

In addition, as described above, when the particle diameter of the particles is decreased, the temperature can be controlled to be low. As described above, the ink composition may be adjusted so as to obtain a desired first thickening peak temperature.

The SP value of the organic solvent is preferably 10.0 to 17.0. The SP value of the resin is preferably 7.0 to 13.0. The SP value of the resin is preferably lower than the SP value of the organic solvent.

In addition, in the ink composition used in the ink jet recording method according to this embodiment, although the temperature of the maximum thickening peak is 70° C. or more, the temperature described above is more preferably 80° C. or more and further preferably 85° C. or more. In addition, the temperature of the maximum thickening peak is preferably 120° C. or less and more preferably 110° C. or less. When the temperature of the maximum thickening peak is set in the range described above, the ink composition can be preferably used in the ink jet recording method in which the ink composition is ejected from an ink jet head and is adhered to a heated recording medium. In addition, durability, such as the wet abrasion resistance, of a recorded matter is excellent.

Furthermore, the logarithmic attenuation at the first thickening peak is preferably 0.2 or more. In addition, the logarithmic attenuation described above is preferably 0.3 or more. On the other hand, although an upper limit of the logarithmic attenuation described above is not particularly limited, the logarithmic attenuation described above is preferably 3 or less, more preferably 2 or lese, even more preferably 1 or less, and further preferably 0.5 or less.

The logarithmic attenuation at the maximum thickening peak is preferably 1.0 or more and more preferably 1.2 or more. On the other hand, although an upper limit of the logarithmic attenuation described above is not particularly limited, the logarithmic attenuation described above is preferably 5 or less, more preferably 3 or less, and even more preferably 2 or less.

By the recording method using the ink composition as described above, an image having more excellent image quality and abrasion resistance can be recorded.

The ink composition is adhered to a recording medium by an ink jet method. Hence, a viscosity of the ink composition at 20° C. is set to preferably 1.5 to 15.0 MPa-s, more preferably 1.5 to 7.0 MPa-s, and further preferably 1.5 to 5.5 MPa-s. Since the ink composition is adhered to a recording medium by an ink jet method, a predetermined image can be easily and efficiently formed on the recording medium.

In order to enable the ink composition used in the ink jet recording method according to this embodiment to have an appropriate wet spreadability to a recording medium, a surface tension of the ink composition described above at 25.0° C. is 40.0 mN/m or less, preferably 38.0 mN/m or less, more preferably 35.0 mN/m or less, and further preferably 30.0 mN/m or less.

1.3. Recording Medium

A recording medium to form an image by the ink jet recording method according to this embodiment may have a recording surface which absorbs a liquid such as an ink composition or may have no recording surface which absorbs a liquid. Hence, the recording medium is not particularly limited, and for example, a liquid absorbing recording medium, such as paper or a cloth, a liquid low-absorbing recording medium, such as printing paper, or a liquid non-absorbing recording medium, such as a metal, a glass, a film, or a high molecular weight material, may be mentioned. However, an excellent effect of the recording method according to this embodiment becomes particularly significant when an image is recorded on a liquid low-absorbing or a liquid non-absorbing recording medium.

The liquid low-absorbing recording medium and the liquid non-absorbing recording medium indicate a recording medium hardly absorbing a liquid and a recording medium absorbing no liquid, respectively. From a quantitative point of view, the liquid non-absorbing recording medium or the liquid low-absorbing recording medium indicates a "recording medium having a water absorbing amount of 10 mL/m$^2$ or less from a contact start to a point of 30 msec$^{1/2}$ by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the liquid absorbing recording medium indicates a recording medium not corresponding to the liquid non-absorbing and the liquid low-absorbing recording media. In addition, in this specification, the liquid low-absorbing and the liquid no-absorbing recording media are simply called a low-absorbing recording medium and a non-absorbing recording medium, respectively, in some cases.

As the liquid non-absorbing recording medium, for example, there may be mentioned a film or a plate of a plastic, such as a poly(vinyl chloride), a polyethylene, a polypropylene, or a poly(ethylene terephthalate) (PET); a plate of a metal, such as iron, silver, copper, or aluminum; a metal plate or a plastic film formed by deposition of at least one of the above various metals; or a plate of an alloy, such as stainless steel or brass. In addition, for example, as the recording medium described above, a medium in which a plastic is coated on a substrate such as paper, a medium in which a plastic film is adhered to a substrate such as paper, or a plastic film having no absorbing layer (receiving layer) may also be mentioned. As the plastic described above, for example, there may be mentioned a poly(vinyl chloride), a poly(ethylene terephthalate), a polycarbonate, a polystyrene, a polyurethane, a polyethylene, or a polypropylene.

In addition, as the liquid low-absorbing recording medium, a recording medium having a surface on which a coating layer (receiving layer) to receive a liquid is provided may be mentioned. For example, as a recording medium using paper as a substrate, printing paper may be mentioned, and as a recording medium using a plastic film as a substrate, a recording medium in which, for example, a hydrophilic polymer is applied on a surface formed, for example, from a poly(vinyl chloride), a poly(ethylene terephthalate), polycarbonate, a polystyrene, a polyurethane, a polyethylene, or a polypropylene or a recording medium in which particles formed of silica, titanium, or the like are applied together with a binder on the surface as described above may be mentioned.

Although the liquid absorbing recording medium is not particularly limited, for example, there may be mentioned regular paper, such as electrophotographic paper, having a high liquid permeability; ink jet paper (ink jet exclusive paper having an ink absorbing layer formed from silica particles or aluminum particles or having an ink absorbing layer formed from a hydrophilic polymer, such as a poly (vinyl alcohol) (PVA) or a poly(vinyl pyrrolidone) (PVP)); or art paper, coated paper, or cast paper, which has a relatively low liquid permeability and which is used for general offset printing. Furthermore, as the liquid absorbing recording medium, for example, a cloth or a non-woven cloth may also be mentioned.

In addition, the recording medium may be, for example, any one of a colorless transparent, a translucent, a colored transparent, a colored opaque, and an achromatic opaque medium. In addition, the recording medium itself may be either colored, translucent, or transparent.

1.4. Ink Jet Recording Apparatus

One example of an ink jet recording apparatus preferably used in the recording method according to this embodiment will be described with reference to the drawings. The ink jet recording apparatus includes an ink jet head to perform an adhesion step of the ink composition and a primary heating mechanism. In addition, the ink jet recording apparatus described above performs a recording method which will be described later.

Figure 2:
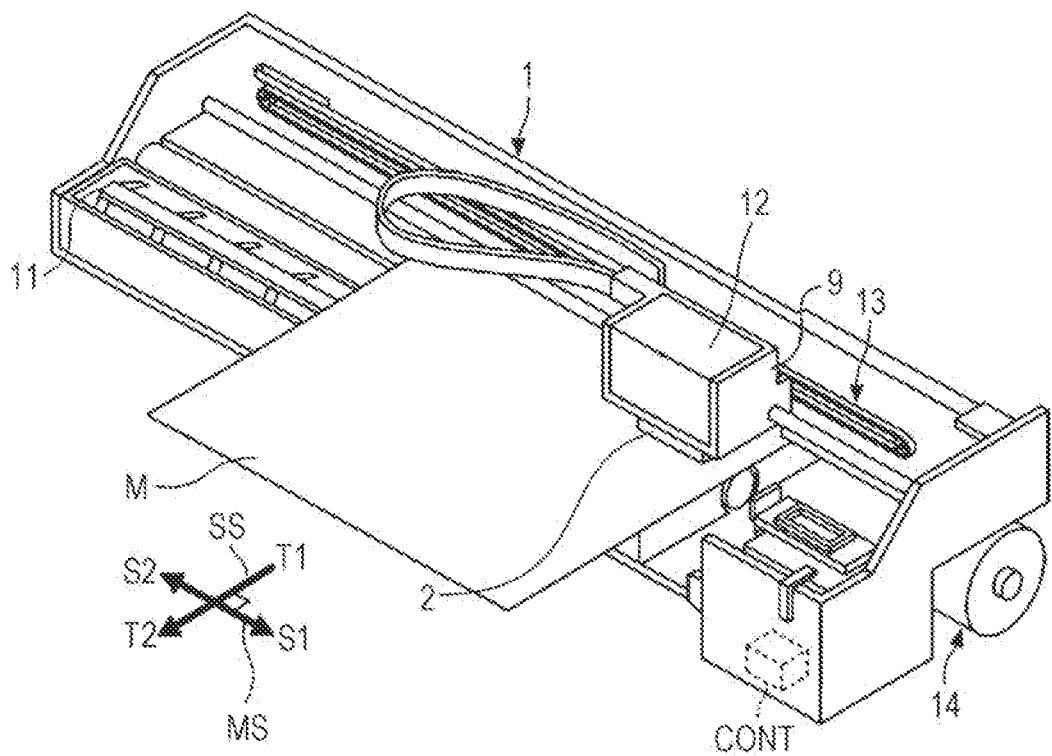
FIG. 2 is a schematic view of a carriage and its vicinity of one example of the ink jet recording apparatus used in the recording method of the embodiment.

FIG. 1 is a cross-sectional view schematically showing an ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes an ink jet head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. All operations of the ink jet recording apparatus 1 are controlled by the control portion CONT shown in FIG. 2.

The ink jet head 2 has a structure to perform recording on a recording medium M by ejecting the ink from a nozzle of the ink jet head 2 to be adhered thereto. In this embodiment, the ink jet head 2 is a serial type ink jet head and adheres the ink to the recording medium M by a plurality of scannings in a main scanning direction relative to the recording medium M. The ink jet head 2 is mounted on the carriage 9 shown in FIG. 2. The ink jet head 2 is scanned a plurality of times in the main scanning direction relative to the recording medium M by the operation of the carriage transfer mechanism 13 to transfer the carriage 9 in a medium width direction of the recording medium M. The medium width direction is the main scanning direction of the ink jet head 2. The scanning in the main scanning direction is also called a main scanning.

In addition, the main scanning direction is a direction in which the carriage 9 mounting the ink jet head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the ink jet head 2 and the sub-scanning which is the transport of the recording medium M are repeatedly performed at least two times, the ink is recorded on the recording medium M. That is, the ink adhesion step is performed by a plurality of main scannings in each of which the ink jet head 2 is transferred in the main scanning direction and a plurality of sub-scannings in each of which the recording medium M is transported in the sub-scanning direction intersecting the main scanning direction.

The cartridge 12 to supply the ink to the ink jet head 2 includes a plurality of independent cartridges. The cartridge 12 is detachably fitted to the carriage 9 mounting the ink jet head 2. In the cartridges, different types of ink compositions are filled, and the ink compositions are supplied to individual nozzles from the cartridge 12. In addition, in this embodiment, although the case in which the cartridge 12 is fitted to the carriage 9 is shown by way of example, the cartridge 12 is not limited thereto and may be provided at a position other than the carriage 9 so that the ink is supplied to each nozzle by a supply tube not shown.

For the ejection by the ink jet head 2, a known method may be used. In this embodiment, a method to eject a liquid droplet using vibration of a piezoelectric element, that is, an ejection method to form an ink droplet by a mechanical deformation of a piezoelectric element, is used.

The ink jet recording apparatus 1 includes the IR heater 3 and the platen heater 4 each of which heats the recording medium M when the ink composition is ejected from the ink jet head 2. In this embodiment, when the recording medium M is dried in a drying step, for example, the IR heater 3 and the ventilation fan 8 which will be described later may be used.

In addition, when the IR heater 3 is used, the recording medium M can be heated using a method to radiate infrared rays from an ink jet head 2 side. Accordingly, although the ink jet head 2 is also liable to be simultaneously heated, compared to the case in which heating is performed from a rear surface of the recording medium M by the platen heater 4 or the like, the temperature can be increased without receiving the influence of the thickness of the recording medium M. In addition, there may be provided various types of fans (such as the ventilation fan 8) to dry the ink on the recording medium M by supplying a hot wind or a wind having the same temperature as that in the environment to the recording medium M.

When the ink composition ejected from the ink jet head 2 is adhered to the recording medium M, in order to dry the ink composition at an early stage, the platen heater 4 is able to heat the recording medium M at a position facing the ink jet head 2 with the platen 11 interposed therebetween. The platen heater 4 is able to heat the recording medium M by a conduction method, and in the recording method of this embodiment, the ink composition can be adhered to the recording medium M heated as described above (primary heating). A surface temperature of the recording medium M in the primary heating is preferably controlled to be 50.0° C. or less.

In addition, an upper limit of the surface temperature of the recording medium M by the IR heater 3 and the platen heater 4 is preferably 45.0° C. or less, more preferably 40.0° C. or less, even more preferably 38.0° C. or less, and further preferably 35.0° C. or less. In addition, a lower limit of the surface temperature of the recording medium M is preferably 25.0° C. or more, more preferably 28.0° C. or more, even more preferably 30.0° C. or more, and further preferably 32.0° C. or more. Accordingly, the drying of the ink composition in the ink jet head 2 and the change in composition thereof can be suppressed, and welding of the ink composition and/or the resin to an inner wall of the ink jet head 2 can be suppressed.

In addition, accordingly, the ink composition can be adhered to the recording medium M thus heated. Hence, the ink composition can be rapidly fixed on the recording medium M, and the image quality thereof can be improved.

The heating heater 5 dries and solidifies the ink composition adhered to the recording medium M, that is, the heating heater 5 is a secondary heating heater or a secondary drying heater. The heating heater 5 can be used in a post-heating step. Since the heating heater 5 heats the recording medium M on which an image is recorded, for example, moisture contained in the ink composition is more rapidly evaporated, and an ink film is formed by the resin contained in the ink composition. As described above, the ink film is tightly fixed or adhered onto the recording medium M so as to have an excellent film forming property, and an image having an excellent high quality can be obtained in a short period. An upper limit of the surface temperature of the recording medium M by the heating heater 5 is preferably 120.0° C. or less, more preferably 100.0° C. or less, and further preferably 90.0° C. or less. In addition, a lower limit of the surface temperature of the recording medium M is preferably 60.0° C. or more, more preferably 70.0° C. or more, and further preferably 80.0° C. or more. Since the temperature is in the range described above, an image having a high quality can be obtained in a short period. In the secondary heating, the surface temperature of the recording medium M described above is also called a secondary heating temperature or a curing temperature in some cases.

The ink jet recording apparatus 1 may also include the cooling fan 6. After the ink composition recorded on the recording medium M is dried, the ink on the recording medium M is cooled by the cooling fan 6, and hence, an ink coating film can be formed to have an excellent adhesion onto the recording medium M.

In addition, the ink jet recording apparatus 1 may also include the pre-heater 7 to heat the recording medium M in advance before the ink composition is adhered to the recording medium M. Furthermore, the ink jet recording apparatus 1 may also include the ventilation fan 8 so as to efficiently dry the ink composition adhered to the recording medium M.

At a lower side of the carriage 9, there are provided the platen 11 to support the recording medium M, the carriage transfer mechanism 13 to transfer the carriage 9 relative to the recording medium M, and the transport device 14 which is a roller to transport the recording medium M in the sub-scanning direction. The operations of the carriage transfer mechanism 13 and the transport device 14 are controlled by the control portion CONT.

Figure 3:
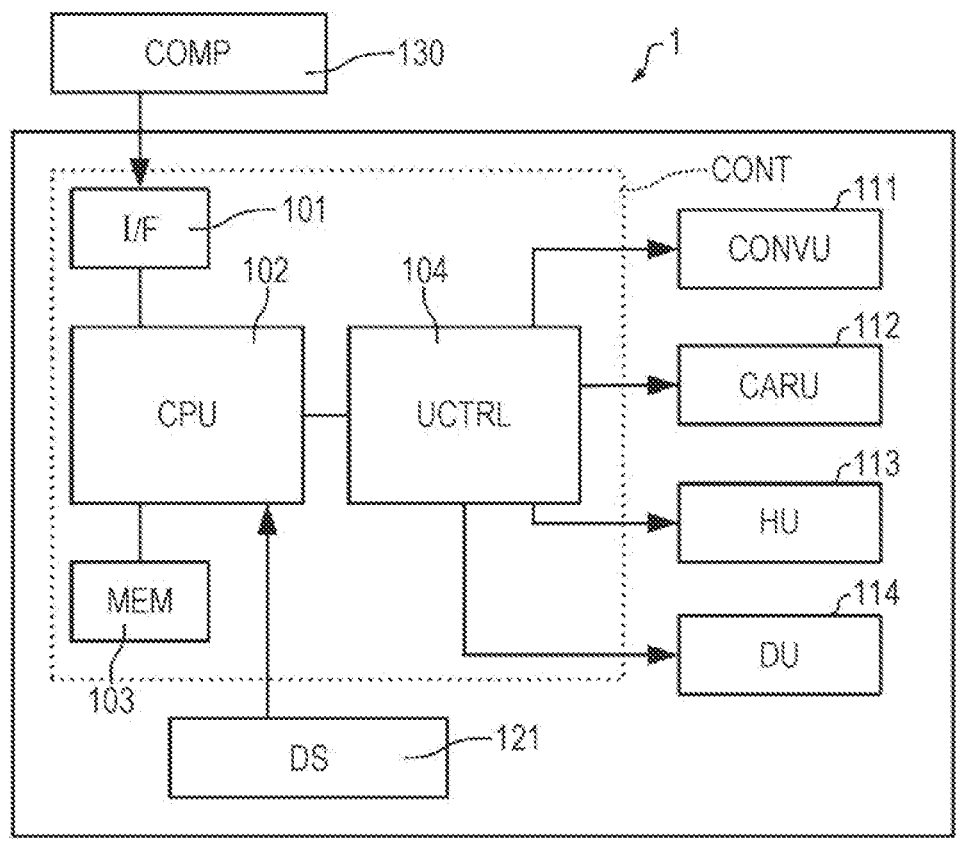
FIG. 3 is a block diagram of one example of the ink jet recording apparatus used in the recording method of the embodiment.

FIG. 3 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A transport unit 111 (CONVU) controls the sub-scanning (transport) of the ink jet recording and in particular, controls a transport direction and a transport rate of the recording medium M. In particular, by controlling a rotation direction and a rotation rate of a transport roller driven by a motor, the transport direction and the transport rate of the recording medium M is controlled.

A carriage unit 112 (CARU) controls the main scanning (pass) of the ink jet recording and in particular, reciprocally transfers the ink jet head 2 in the main scanning direction. The carriage unit 112 includes the carriage 9 mounting the ink jet head 2 and the carriage transfer mechanism 13 to reciprocally transfer the carriage 9.

A head unit 113 (HU) controls an ejection amount of the ink composition from a nozzle of the ink jet head 2. For example, when the nozzle of the ink jet head 2 is driven by a piezoelectric element, the operation of the piezoelectric element of each nozzle is controlled. By the head unit 113, for example, a timing of each ink adhesion and a dot size of the ink composition are controlled. In addition, by combination of controls by the carriage unit 112 and the head unit 113, an adhesion amount of the ink composition per one scanning is controlled.

A drying unit 114 (DU) controls the temperatures of various types of heaters, such as the IR heater 3, the pre-heater 7, the platen heater 4, and the heating heater 5.

In the ink jet recording apparatus 1 described above, an operation in which the carriage 9 mounting the ink jet head 2 is transferred in the main scanning direction and a transport operation (sub-scanning) are alternately repeated. In this step, when each pass is performed, the control portion CONT controls the carriage unit 112 to transfer the ink jet head 2 in the main scanning direction and also controls the head unit 113 to eject a liquid droplet of the ink composition from a predetermined nozzle hole of the ink jet head 2 so as to adhere the liquid droplet to the recording medium M. In addition, the control portion CONT controls the transport unit 111 so that in the transport operation, the recording medium M is transported by a predetermined transport amount (feed amount) in the transport direction.

In the ink jet recording apparatus 1, since the main scanning (pass) and the sub-scanning (transport operation) are repeatedly performed, a recording region to which liquid droplets are adhered is gradually transported. Subsequently, by the heating heater 5, the liquid droplets adhered to the recording medium M are dried, so that an image is completed. Next, the recorded matter thus completed may be wound into a roll shape by a winding mechanism or may be transported by a flatbed mechanism.

Figure 4:
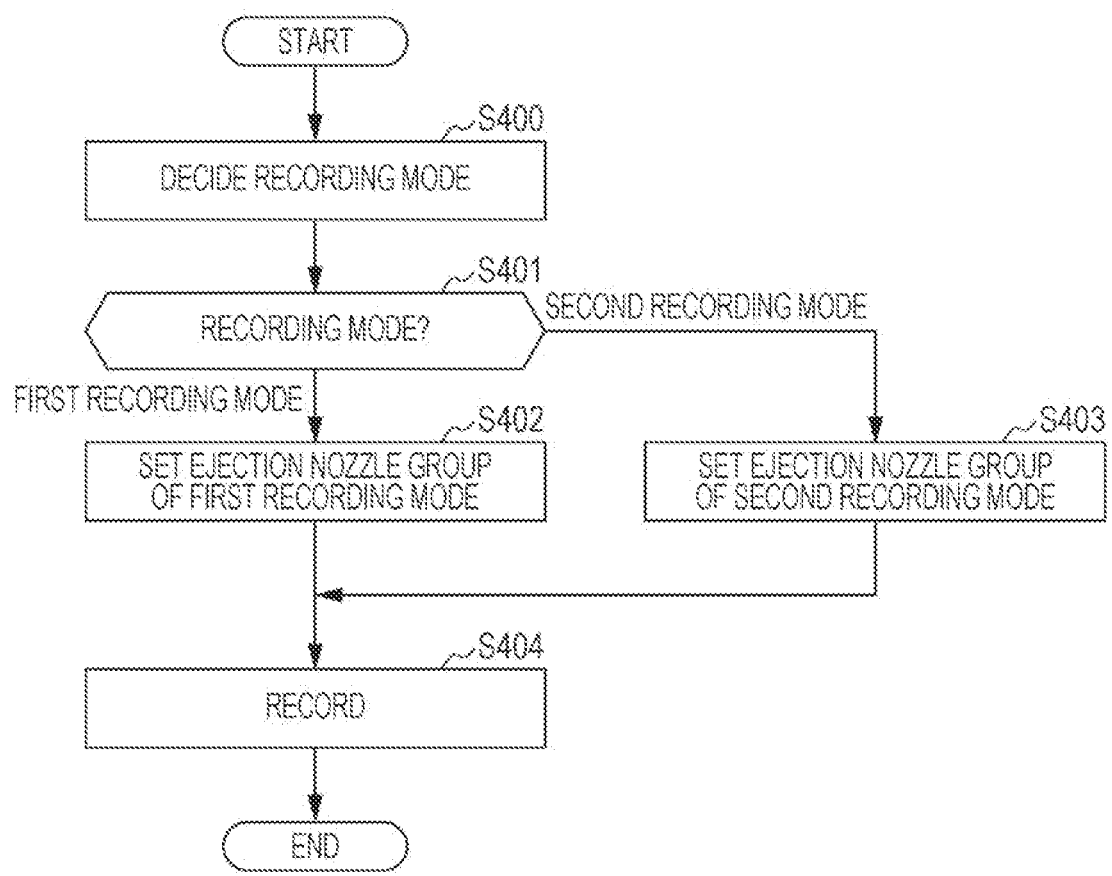
FIG. 4 is a flowchart showing one example of a process performed for recording by the ink jet recording apparatus used in the recording method of the embodiment.

FIG. 4 is an example of a flowchart showing a processing to be performed when recording is performed by the ink jet recording apparatus. When the recoding is started, the control portion of the ink jet recording apparatus decides a recording mode in Step 400. The recording mode is a recording mode in which details of the recording, such as arrangement of nozzles, an ejection amount, an overlap printing mode, an operation of the ink jet head in the recording, and an operation of the recording medium, are determined. In the details of the recording described above, the number of passes (the number of the main scannings performed on the same recording region of the recording medium) for the recording is also included.

The decision of the recording mode is performed by an input signal input from an external apparatus, such as a computer, to the ink jet recording apparatus or by input information of a user to a user input portion of the ink jet recording apparatus. In this case, the input signal from the external apparatus or the input information of the user may be information to directly designate the recording mode or may be information relating to the recording, such as information on type of recording medium on which recording is performed, designation of a recording rate, and/or designation of an image quality. In addition, the information relating to the recoding is not limited to those described above. In the latter case, the ink jet recording apparatus records in advance, for example, in the control portion thereof, correspondence information in which a recording mode corresponding to the information relating to the recording is determined and decides a recording mode with reference to the correspondence information. Alternatively, the recording mode may be decided using an AI technique (artificial intelligence technique).

In Step S401, the decided recording mode is discriminated. In Step S402 or Step S403, in accordance with the decided recording mode, the number of passes is set. In Step S404, the recording is carried out. As the type of recording mode, although two recording modes, that is, a first recording mode and a second recording mode, are shown in the drawing, the number of recording modes may also be at least three.

In this example, the recording apparatus is able to change the number of passes (the number of the main scannings performed in the same recording region of the recording medium) in accordance with the recording mode, and various types of recordings can be preferably performed.

1.5. Ink Jet Recording Method

A recording method of this embodiment is a recording method which includes an adhesion step of ejecting an ink composition from an ink jet head so as to be adhered to a recording medium and a primary heating step of heating the ink composition adhered to the recording medium, the adhesion step includes at least one main scanning to adhere the ink composition to the recording medium while a relative position of the ink jet head and the recording medium is changed in a main scanning direction and at least one sub-scanning to change the relative position of the ink jet head and the recording medium in a sub-scanning direction, and the number of the main scannings performed on the same recording region of the recording medium is 5 or less.

1.5.1. Ink Adhesion Step

A recording method of this embodiment is performed, for example, by using the ink jet recording apparatus described above such that at least one main scanning to adhere an ink composition to a recording medium is performed while a relative position of an ink jet head and a recording medium is changed in a main scanning direction, at least one sub-scanning to change the relative position of the ink jet head and the recording medium in a sub-scanning direction is performed, and the number of the main scannings performed on the same recording region of the recording medium is set to 5 or less. In the recording method described above, the ink adhesion performed as described above is an ink adhesion step (adhesion step).

Figure 5:
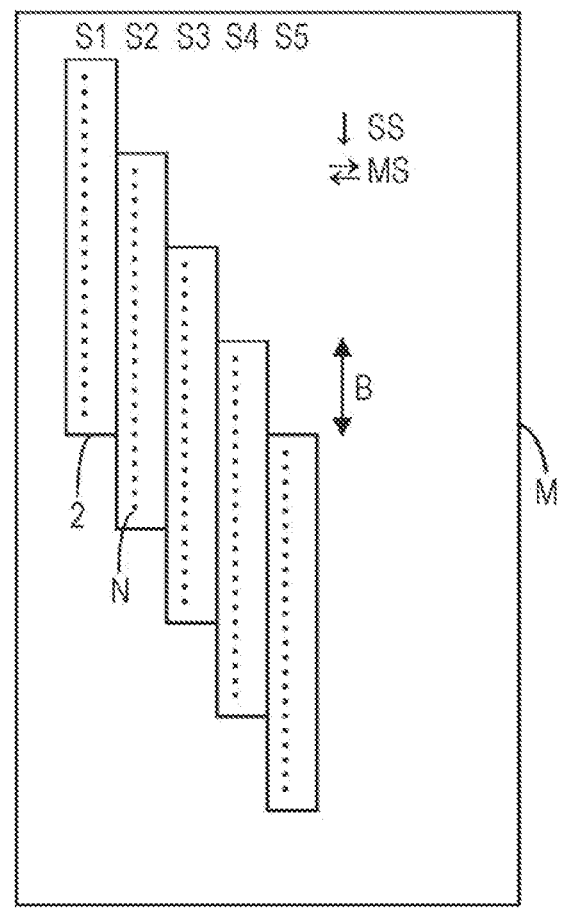
FIG. 5 is a schematic view showing one example of a main scanning in the recording method of the embodiment.

FIG. 5 is a schematic view illustrating one example of the main scanning performed in the ink adhesion step. In FIG. 5, although positions of the ink jet head 2 in individual main scannings, such as a position of the ink jet head 2 in a main scanning S1 and a position of the ink jet head 2 in a main scanning S2 following the main scanning S1, are shown, in practice, the number of the ink jet heads 2 provided in the ink jet recording apparatus is one.

In the ink jet head 2, a nozzle line in which a plurality of nozzles N is disposed along the sub-scanning direction SS is provided. Although being shown so as to be viewed from a front side of the drawing, the nozzles N are actually disposed at a side facing the recording medium so as to be viewed from a rear side of the drawing.

In the recording method, while the ink jet head 2 located at the position S1 is transferred as the main scanning S1 along one direction of the main scanning direction MS, the main scanning is performed by ejecting the ink composition from the nozzles to the recording medium. Accordingly, the ink jet head 2 is transferred along one direction of the main scanning direction MS from one end to the other end of the recording medium M. Subsequently, the ink jet head 2 performs the sub-scanning so as to be transferred in the sub-scanning direction SS with respect to the recording medium by a distance B. Next, as the main scanning S2 following the main scanning S1, the ink jet head 2 located at the position S2 performs the main scanning in a manner similar to that described above. Subsequently, the ink jet head 2 performs the sub-scanning in a manner similar to that described above. Next, the main scannings from S3 and the sub-scannings corresponding thereto are alternately repeatedly performed, so that recording is performed. Although not shown in the drawing, as for the following main scannings from S6 and the preceding main scannings before S1, the main scannings and the sub-scannings are alternately performed in a manner similar to that described above. As described above, the main scannings and the sub-scannings are performed a plurality of times, so that the recording is performed.

FIG. 5 shows a relative position in the sub-scanning direction of the recording medium M and the ink jet head 2 in each main scanning. The main scanning may be performed by transferring the recording medium M in the main scanning direction with respect to the ink jet head 2. That is, the main scanning is a scanning performed by changing the relative position of the ink jet head and the recording medium in the main scanning direction.

As described above, the sub-scanning may also be performed by transferring the recording medium M in an upper-side direction of the drawing with respect to the ink jet head 2. That is, the sub-scanning is a scanning performed by changing the relative position of the ink jet head and the recording medium in the sub-scanning direction.

The sub-scanning is the scanning to change the relative position of the ink jet head 2 and the recording medium M in the sub-scanning direction and is performed between the main scanning right before the sub-scanning and the main scanning right after the sub-scanning. That is, in the main scanning right before the sub-scanning and the main scanning right after the sub-scanning, recording regions thereof in each of which the ink can be adhered to the recording medium by ejection of the ink from the ink jet head are at least partially made different from each other. The sub-scanning is different from the main scanning and is performed without ejecting the ink to the recording medium M from the ink jet head 2.

For example, in the sub-scanning of the example shown in FIG. 5, although the sub-scanning direction is a direction intersecting the main scanning direction, the sub-scanning direction is not limited thereto, and between the main scanning right before the sub-scanning and the main scanning right after the sub-scanning, the recording regions thereof in each of which the ink can be adhered to the recording medium by ejection of the ink from the ink jet head may be at least partially different from each other.

In the example of FIG. 5, to a band-shaped recording region having a length B in the sub-scanning direction and extending in the main scanning direction, the ink is adhered by performing the main scanning 4 times. That is, the distance of one sub-scanning is approximately one fourth of the length of a part of the ink jet head 2 in the sub-scanning direction in which the nozzle line is provided.

In the recording method of this embodiment, the number of the main scannings performed on the same recording region of the recording medium is 5 or less. In the example of FIG. 5, when a focus is paid on a region in which the ink is adhered by one main scanning by the ink jet head 2, that is, on a band-shaped region having the length of the ink jet head 2 in the sub-scanning direction and extending in the main scanning direction, the ink is adhered on each part of this region by performing the main scanning 4 times. As described above, in the example of FIG. 5, the number of the main scannings performed on the same recording region of the recording medium is 4.

The number of the main scannings performed on the same recording region of the recording medium is called a main scanning number or a pass number. When the number of the main scannings is 2 to more, the ink necessary for an image to be recorded is adhered by at least two main scannings. Hence, as the number of the main scannings is larger, degradation in image quality, such as bleeding caused by mixing and gathering of adjacent ink droplets, can be suppressed. On the other hand, the recording rate is decreased. In addition, as the number of main scannings is smaller, adjacent ink droplets may be adhered to each other in the same main scanning at a higher provability, and as described above, the image quality tends to be degraded. On the other hand, the recording rate is preferably high.

In the recording method of this embodiment, the number of the main scannings is 5 or less. The number of the main scannings may be 4 or less and may also be 3 or less. Accordingly, the recording can be performed at a higher rate. The number of the main scannings is at least one and is preferably at least two since the image quality is more improved.

In the chart of the logarithmic attenuation with temperature obtained by measurement of an ink composition using a rigid-body pendulum characteristics test, as described above, the ink composition used in the recording method of this embodiment has a first thickening peak temperature of 30° C. to 65° C. and a maximum thickening peak temperature is 70° C. or more. In the case in which the first thickening peak temperature is in the range described above, when the ink is heated in the primary heating step which will be described later, the ink is rapidly thickened, and the spread and the transfer of the ink composition are suppressed. Accordingly, even when the number of ink droplets to be adhered to the recording medium by one main scanning is increased, for example, blurring of an image can be suppressed. Hence, even if the number of the main scannings is 5 or less, an image having a high quality is likely to be obtained. In addition, since the number of the main scannings is set to 5 or less, the recording rate of the image is high.

In addition, since the ink composition has a maximum thickening peak temperature of 70° C. or more, a recorded matter having an excellent durability can be obtained.

1.5.2. Primary Heating Step

The recording method of this embodiment includes a primary heating step. The primary heating step is a step to dry the ink adhered to the recording medium at an early stage by heating. The primary heating step is a heating step of drying at least a part of a solvent component of the ink so as to at least decrease the flow of the ink adhered to the recording medium. The primary heating step preferably starts heating of ink droplets landed on the recording medium within 0.5 seconds after the landing thereof.

In the example of the FIG. 1, for example, the primary heating step may be performed by a conduction method using the platen heater 4 or the pre-heater 7, a radiation method using the IR heater 3, or a ventilation method using the ventilation fan 8. The primary heating step is performed by at least one of the heating mechanisms described above.

In addition, in the primary heating step, when a ventilation type drying mechanism is used, an image having a particularly excellent quality can be preferably obtained. Although the ventilation may be performed with a hot wind, when being used in combination with another heating mechanism, the ventilation may be performed with an ordinary-temperature wind.

The primary heating step may be performed so that the ink is adhered to a heated recording medium or the ink adhered to the recording medium is heated at an early stage after the adhesion as described above.

In the primary heating step, a surface temperature of a recording surface of the recording medium is preferably 50° C. or less. On the other hand, the surface temperature described above is preferably 28° C. or more, more preferably 30° C. to 48° C., even more preferably 35° C. to 47° C., and further preferably 40° C. to 45° C. The temperature described above is a temperature of a part of the recording medium at which the primary heating step is performed and is the maximum temperature during the recording.

1.5.3. Other Steps

The ink jet recording method of this embodiment includes the ink adhesion step described above. However, if needed, the ink jet recording method of this embodiment may further include at least one step of adhering at least one type of ink composition to the recording medium. In the case described above, the order and the number of the steps described above are not limited, and as needed, the steps may be appropriately performed. Furthermore, the ink jet recording method of this embodiment may also include, after the ink adhesion step, for example, a secondary heating step (such as a post-heating step) of heating the recording medium.

The secondary heating step is a heating step of sufficiently performing heating to complete the recording so that a recorded matter can be used. The secondary heating step is a heating step to sufficiently dry the solvent component of the ink and to enable a coating film of the ink to be flat by heating the resin contained in the ink. The secondary heating step is preferably started at more than 0.5 seconds after the ink is adhered to the recording medium. For example, at more than 0.5 seconds after the ink adhesion to a recording region of the recording medium is completed, the heating is preferably started on the above recording region.

The secondary heating step is performed, for example, using an appropriate heating device. The post-heating step is performed, for example, by an after heater (in the above example of the ink jet recording apparatus, the heating heater 5 functions as the after heater). In addition, the heating device is not limited to the heating devices provided in the ink jet recording apparatus, and another heating device may also be used. Accordingly, since an image thus obtained can be dried and can be sufficiently fixed, for example, a recorded matter can be rapidly placed in a ready-to-use state. The secondary heating step may be performed by a heating mechanism using a conduction method, a radiation method, a ventilation method, or the like.

Although a temperature of the recording medium in this case is not particularly limited, for example, the temperature described above may be set in consideration of the Tg or the like of the resin forming the fixing resin contained in the recorded matter. When the Tg of the resin forming the fixing resin is taken into consideration, the temperature of the recording medium is set to be higher than the Tg of the resin forming the fixing resin by 5.0° C. or more and preferably by 10.0° C. or more.

A surface temperature of the recording medium obtained by the heating in the post-heating step is 30.0° C. to 120.0° C., preferably 40.0° C. to 100.0° C., more preferably 50.0° C. to 95° C., even more preferably 55° C. to 93° C., further preferably 60° C. to 93° C., and even further preferably 70° C. to 90° C. The surface temperature of the recording medium obtained by the heating in the post-heating step is particularly preferably 80° C. or more. When the temperature of the recording medium is in the range described above, the film formation and the planarization of the fixing resin contained in the recorded matter can be performed, and in addition, an image thus obtained is dried and can be more sufficiently fixed.

1.6. Operational Effect

According to the recording method of this embodiment, since an ink composition having a first thickening peak temperature of 30° C. to 65° C. is used, when the ink composition is adhered to a heated recording medium, the spread and the transfer of the ink composition adhered to the heated recording medium can be rapidly suppressed. Accordingly, even when the number of ink droplets to be adhered to the recording medium by one main scanning is increased, for example, blurring of an image can be suppressed. Hence, even when the number of the main scannings is 5 or less, an image having a high quality is likely to be obtained. In addition, since the number of the main scannings is 5 or less, the recording rate of the image is rapid. Furthermore, since the ink having a maximum thickening peak temperature of 70° C. or more is used, a film of the resin is formed on the recording medium at a higher temperature, and hence, the abrasion resistance of the image is also improved.

2. EXAMPLES

Hereinafter, although the present disclosure will be described in more detail with reference to examples, the present disclosure is not limited thereto. Hereinafter, "%" is represented on mass basis unless otherwise particularly noted.

2.1. Preparation of Resin

As described below, dispersion resins A1 to A3 and fixing resins B1 to B5 were synthesized.

Synthesis of Dispersion Resin A1

A reaction chamber equipped with a dripping device, a thermometer, a water-cooled reflux condenser, and a stirrer was prepared. In this chamber, 100 parts by mass of ion-exchange water and 0.4 parts by mass of potassium persulfate functioning as a polymerization initiator were charged. The chamber was heated to 70° C. A mixed liquid containing 144 parts by mass of monomers at a mass ratio shown in Table 1, 67 parts by mass of ion-exchange water, and 0.52 parts by mass of t-dodecylmercaptan was dripped in the chamber described above with stirring in a nitrogen atmosphere for a polymerization reaction. After the polymerization reaction was completed, neutralization was performed with sodium hydroxide to have a pH of 8 to 8.5, and then filtration was performed using a 0.3-μm filter, so that the dispersion resin A1 was obtained.

Synthesis of Dispersion Resins A2 and A3

Except for that the monomer compositions were formed to have the mass ratios shown in Table 1, the dispersion resins A2 and A3 were respectively obtained in a manner similar to that of the synthesis of the dispersion resin A1.

Synthesis of Fixing Resin B1

Except for that 0.25 parts by mass of sodium laurylate was added as an emulsifier, and the monomer composition was formed to have the mass ratio shown in Table 1, the fixing resin B1 was obtained in a manner similar to that of the synthesis of the dispersion resin A1.

Synthesis of Fixing Resins B2 to B5

Except for that the monomer compositions were formed to have the mass ratios shown in Table 1, the fixing resins B2 to B5 were respectively obtained in a manner similar to that of the synthesis of the fixing resin B1. In addition, the particle diameter of the fixing resin B5 was adjusted by controlling a dripping rate and a stirring rate during the polymerization.

TABLE 1

| MONOMER | CALCULATED VALUE HSP (cal/cm)$^{1/2}$ | MOLECULAR WEIGHT | DISPERSION RESIN | | | FIXING RESIN | | | | |
|---|---|---|---|---|---|---|---|---|---|---|
| | | | A1 | A2 | A3 | B1 | B2 | B3 | B4 | B5 |
| STYRENE | 9.3 | 104.2 | — | — | — | 40.0 | 40.0 | 40.0 | 40.0 | 40.0 |
| METHACRYLIC ACID | 9.8 | 86.1 | 40.0 | 40.0 | 40.0 | — | — | — | — | — |
| METHYL METHACRYLATE | 8.8 | 100.1 | 20.0 | — | — | — | — | — | — | — |
| ETHYL METHACRYLATE | 9.2 | 114.0 | — | 60.0 | — | — | — | — | — | — |
| 2-HYDROXYETHYL METHACRYLATE | 11.1 | 130.1 | 40.0 | — | — | — | — | — | — | — |
| 2-ETHYLHEXYL METHACRYLATE | 8.1 | 198.3 | — | — | 5.0 | — | — | — | — | — |
| LAURYL METHACRYLATE | 7.5 | 254.0 | — | — | 55.0 | — | 10.0 | 45.0 | — | 10.0 |
| ACRYLIC ACID | 10.0 | 72.0 | — | — | — | 20.0 | 20.0 | 15.0 | 10.0 | 20.0 |
| METHYLACRYLATE | 9.4 | 86.0 | — | — | — | 15.0 | 25.0 | — | — | 25.0 |
| 2-HYDROXYETHYL ACRYLATE | 12.1 | 116.1 | — | — | — | 25.0 | 5.0 | — | 15.0 | 5.0 |
| 2-ETHYLHEXYL ACRYLATE | 7.9 | 184.3 | — | — | — | — | — | — | 35.0 | — |
| MONOMER TOTAL | | | 100 | 100 | 100 | 100 | 100 | 100 | 100 | 100 |
| POLYMER SP VALUE (cal/cm)$^{1/2}$ | | | 10.0 | 9.5 | 9.0 | 10.1 | 9.6 | 9.1 | 9.5 | 9.6 |
| POLYMER Tg (° C.) | | | 107.8 | 102.0 | 74.4 | 62.4 | 64.1 | 63.6 | 41.6 | 64.1 |
| VOLUME AVERAGE PARTICLE DIAMETER D50 (nm) | | | — | — | — | 54 | 58 | 56 | 55 | 97 |

2.2. Physical Properties of Resin

Glass Transition Temperature (Tg) A differential scanning calorimetry (DSC) in accordance with JIS K7121 was performed on each resin obtained as described above to measure the glass transition temperature Tg (° C.) thereof, and the results are shown in Tables 1 to 3. As a differential scanning calorimeter, a "DSC6220" model manufactured by Seiko Instruments Inc. was used.

HSP Value

An HSP value (SP value by Hansen Method) of each resin was calculated by weight average of HSP values of monomers of the resin based on the number of moles, and the results are shown in Table 1.

Volume Average Particle Diameter

A volume average particle diameter (D50) of the fixing resin was measured as the D50 value by a dynamic light scattering method, and the results are shown in Table 1. As a measurement device, "nanotrac wave II" (manufactured by MicrotracBEL) was used.

2.3. Preparation of Ink Composition

After components were charged in a container to have one of compositions shown in Table 2 or 3 and were mixed and stirred for 2 hours by a magnetic stirrer, filtration was performed using a membrane filter having a pore diameter of 5 μm, so that an ink composition according to one of examples and comparative examples was obtained.

TABLE 2

| | | | M1 | M2 | M3 | M4 |
|---|---|---|---|---|---|---|
| PIGMENT | | PIGMENT PR122 (D50 = 97 nm) | 4.0 | 4.0 | 4.0 | 4.0 |
| | | PIGMENT PR122 (D50 = 53 nm) | — | — | — | — |
| RESIN | DISPERSION RESIN | A1 (Tg = 107.8° C.) | 1.0 | 1.0 | 1.0 | 1.0 |
| | | A2 (Tg = 102° C.) | — | — | — | — |
| | | A3 (Tg = 74.4° C.) | — | — | — | — |
| | FIXING RESIN | B1 (Tg = 62.4° C., D50 = 54 nm) | 2.0 | — | — | — |
| | | B2 (Tg = 64.1° C., D50 = 58 nm) | — | 2.0 | — | 2.0 |
| | | B3 (Tg = 63.6° C., D50 = 56 nm) | — | — | 2.0 | — |
| | | B4 (Tg = 41.6° C., D50 = 55 nm) | — | — | — | — |
| | | B5 (Tg = 64.1° C., D50 = 97 nm) | — | — | — | — |
| ORGANIC SOLVENT | 2-PYRROLIDONE | | 5.0 | 5.0 | 5.0 | 10.0 |
| | 1,2- PROPANEDIOL | | 9.0 | 9.0 | 9.0 | 4.0 |
| | 1,2- BUTANEDIOL | | — | — | — | — |
| | 1,3- BUTANEDIOL | | 4.0 | 4.0 | 4.0 | 4.0 |
| | 1,3- PROPANEDIOL | | — | — | — | — |
| | 1,5- PENTANEDIOL | | — | — | — | — |
| | 1,2- HEXANEDIOL | | 2.0 | 2.0 | 2.0 | 2.0 |
| | GLYCERIN | | — | — | — | — |
| SURFACTANT | BYK348 | | 1.0 | 1.0 | 1.0 | 1.0 |
| WAX | AQ515 | | 0.5 | 0.5 | 0.5 | 0.5 |
| WATER | PURE WATER | | BALANCE | BALANCE | BALANCE | BALANCE |
| | TOTAL | | 100 | 100 | 100 | 100 |
| | ORGANIC SOLVENT TOTAL (%) | | 20 | 20 | 20 | 20 |
| | FIRST THICKENING PEAK TEMPERATURE (° C.) | | 44 | 52 | 58 | 47 |
| | LOGARITHMIC ATTENUATION AT FIRST THICKENING PEAK | | 0.6 | 0.4 | 0.3 | 0.5 |
| | MAXIMUM THICKENING PEAK TEMPERATURE (° C.) | | 91 | 85 | 95 | 95 |
| | LOGARITHMIC ATTENUATION AT MAXIMUM THICKENING PEAK | | 1.9 | 2.0 | 1.5 | 2.3 |

| | | | M5 | M6 | M7 | M8 |
|---|---|---|---|---|---|---|
| PIGMENT | | PIGMENT PR122 (D50 = 97 nm) | 4.0 | 4.0 | 4.0 | 4.0 |
| | | PIGMENT PR122 (D50 = 53 nm) | — | — | — | — |
| RESIN | DISPERSION RESIN | A1 (Tg = 107.8° C.) | 1.0 | 1.0 | 1.0 | 1.0 |
| | | A2 (Tg = 102° C.) | — | — | — | — |
| | | A3 (Tg = 74.4° C.) | — | — | — | — |
| | FIXING RESIN | B1 (Tg = 62.4° C., D50 = 54 nm) | — | — | — | — |
| | | B2 (Tg = 64.1° C., D50 = 58 nm) | 2.0 | 2.0 | 2.0 | 2.0 |
| | | B3 (Tg = 63.6° C., D50 = 56 nm) | — | — | — | — |
| | | B4 (Tg = 41.6° C., D50 = 55 nm) | — | — | — | — |
| | | B5 (Tg = 64.1° C., D50 = 97 nm) | — | — | — | — |
| ORGANIC SOLVENT | 2-PYRROLIDONE | | — | 5.0 | 5.0 | 5.0 |
| | 1,2- PROPANEDIOL | | 9.0 | 13.0 | — | 13.0 |
| | 1,2- BUTANEDIOL | | — | — | — | — |
| | 1,3- BUTANEDIOL | | 6.0 | — | 13.0 | 8.0 |
| | 1,3- PROPANEDIOL | | — | — | — | — |
| | 1,5- PENTANEDIOL | | — | — | — | — |
| | 1,2- HEXANEDIOL | | 3.0 | 2.0 | 2.0 | 2.0 |
| | GLYCERIN | | — | — | — | — |
| SURFACTANT | BYK348 | | 1.0 | 1.0 | 1.0 | 1.0 |
| WAX | AQ515 | | 0.5 | 0.5 | 0.5 | 0.5 |
| WATER | PURE WATER | | BALANCE | BALANCE | BALANCE | BALANCE |
| | TOTAL | | 100 | 100 | 100 | 100 |
| | ORGANIC SOLVENT TOTAL (%) | | 18 | 20 | 20 | 28 |
| | FIRST THICKENING PEAK TEMPERATURE (° C.) | | 56 | 52 | 52 | 51 |
| | LOGARITHMIC ATTENUATION AT FIRST THICKENING PEAK | | 0.3 | 0.5 | 0.5 | 0.4 |
| | MAXIMUM THICKENING PEAK TEMPERATURE (° C.) | | 95 | 86 | 86 | 90 |
| | LOGARITHMIC ATTENUATION AT MAXIMUM THICKENING PEAK | | 1.4 | 2.0 | 2.0 | 2.4 |

| | | | M9 | M10 | M11 |
|---|---|---|---|---|---|
| PIGMENT | | PIGMENT PR122 (D50 = 97 nm) | 4.0 | 4.0 | 4.0 |
| | | PIGMENT PR122 (D50 = 53 nm) | — | — | — |
| RESIN | DISPERSION RESIN | A1 (Tg = 107.8° C.) | 1.0 | 1.0 | 1.0 |
| | | A2 (Tg = 102° C.) | — | — | — |
| | | A3 (Tg = 74.4° C.) | — | — | — |
| | FIXING RESIN | B1 (Tg = 62.4° C., D50 = 54 nm) | — | — | — |
| | | B2 (Tg = 64.1° C., D50 = 58 nm) | 2.0 | 2.0 | 1.0 |
| | | B3 (Tg = 63.6° C., D50 = 56 nm) | — | — | — |
| | | B4 (Tg = 41.6° C., D50 = 55 nm) | — | — | — |
| | | B5 (Tg = 64.1° C., D50 = 97 nm) | — | — | — |

TABLE 2-continued

|  |  |  |  |  |
|---|---|---|---|---|
| ORGANIC SOLVENT | 2-PYRROLIDONE | 4.0 | 5.0 | 5.0 |
|  | 1,2- PROPANEDIOL | 6.0 | 6.0 | 9.0 |
|  | 1,2- BUTANEDIOL | — | — | — |
|  | 1,3- BUTANEDIOL | 3.0 | 4.0 | 4.0 |
|  | 1,3- PROPANEDIOL | — | — | — |
|  | 1,5- PENTANEDIOL | — | — | — |
|  | 1,2- HEXANEDIOL | 2.0 | 2.0 | 2.0 |
|  | GLYCERIN | — | 3.0 | — |
| SURFACTANT | BYK348 | 1.0 | 1.0 | 1.0 |
| WAX | AQ515 | 0.5 | 0.5 | 0.5 |
| WATER | PURE WATER | BALANCE | BALANCE | BALANCE |
|  | TOTAL | 100 | 100 | 100 |
|  | ORGANIC SOLVENT TOTAL (%) | 15 | 20 | 20 |
|  | FIRST THICKENING PEAK TEMPERATURE (° C.) | 54 | 61 | 49 |
|  | LOGARITHMIC ATTENUATION AT FIRST THICKENING PEAK | 0.6 | 0.5 | 0.4 |
|  | MAXIMUM THICKENING PEAK TEMPERATURE (° C.) | 95 | 96 | 84 |
|  | LOGARITHMIC ATTENUATION AT MAXIMUM THICKENING PEAK | 1.7 | 0.7 | 1.9 |

TABLE 3

|  |  |  | M12 | M13 | M14 | M15 |
|---|---|---|---|---|---|---|
| PIGMENT |  | PIGMENT PR122 (D50 = 97 nm) | 4.0 | 4.0 | 4.0 | 4.0 |
|  |  | PIGMENT PR122 (D50 = 53 nm) | — | — | — | — |
| RESIN | DISPERSION RESIN | A1 (Tg = 107.8° C.) | 1.0 | 1.0 | 1.0 | — |
|  |  | A2 (Tg = 102° C.) | — | — | — | 1.0 |
|  |  | A3 (Tg = 74.4° C.) | — | — | — | — |
|  | FIXING RESIN | B1 (Tg = 62.4° C., D50 = 54 nm) | — | — | — | 2.0 |
|  |  | B2 (Tg = 64.1° C., D50 = 58 nm) | 4.0 | — | — | — |
|  |  | B3 (Tg = 63.6° C., D50 = 56 nm) | — | — | — | — |
|  |  | B4 (Tg = 41.6° C., D50 = 55 nm) | — | 2.0 | — | — |
|  |  | B5 (Tg = 64.1° C., D50 = 97 nm) | — | — | 2.0 | — |
| ORGANIC SOLVENT | 2-PYRROLIDONE |  | 5.0 | 5.0 | 5.0 | 5.0 |
|  | 1,2- PROPANEDIOL |  | 9.0 | 9.0 | 9.0 | 9.0 |
|  | 1,2- BUTANEDIOL |  | — | — | — | — |
|  | 1,3- BUTANEDIOL |  | 4.0 | 4.0 | 4.0 | 4.0 |
|  | 1,3- PROPANEDIOL |  | — | — | — | — |
|  | 1,5- PENTANEDIOL |  | — | — | — | — |
|  | 1,2- HEXANEDIOL |  | 2.0 | 2.0 | 2.0 | 2.0 |
|  | GLYCERIN |  | — | — | — | — |
| SURFACTANT | BYK348 |  | 1.0 | 1.0 | 1.0 | 1.0 |
| WAX | AQ515 |  | 0.5 | 0.5 | 0.5 | 0.5 |
| WATER | PURE WATER |  | BALANCE | BALANCE | BALANCE | BALANCE |
|  | TOTAL |  | 100 | 100 | 100 | 100 |
|  | ORGANIC SOLVENT TOTAL (%) |  | 20 | 20 | 20 | 20 |
|  | FIRST THICKENING PEAK TEMPERATURE (° C.) |  | 53 | 52 | 53 | 49 |
|  | LOGARITHMIC ATTENUATION AT FIRST THICKENING PEAK |  | 0.5 | 0.4 | 0.2 | 0.5 |
|  | MAXIMUM THICKENING PEAK TEMPERATURE (° C.) |  | 86 | 75 | 91 | 87 |
|  | LOGARITHMIC ATTENUATION AT MAXIMUM THICKENING PEAK |  | 2.2 | 2.1 | 1.4 | 1.9 |

|  |  |  | M16 | M17 | M18 | M19 |
|---|---|---|---|---|---|---|
| PIGMENT |  | PIGMENT PR122 (D50 = 97 nm) | — | 4.0 | 4.0 | 4.0 |
|  |  | PIGMENT PR122 (D50 = 53 nm) | 4.0 | — | — | — |
| RESIN | DISPERSION RESIN | A1 (Tg = 107.8° C.) | 1.0 | 1.0 | — | — |
|  |  | A2 (Tg = 102° C.) | — | — | 1.0 | — |
|  |  | A3 (Tg = 74.4° C.) | — | — | — | 1.0 |
|  | FIXING RESIN | B1 (Tg = 62.4° C., D50 = 54 nm) | — | — | — | — |
|  |  | B2 (Tg = 64.1° C., D50 = 58 nm) | 2.0 | 2.0 | — | — |
|  |  | B3 (Tg = 63.6° C., D50 = 56 nm) | — | — | 2.0 | 2.0 |
|  |  | B4 (Tg = 41.6° C., D50 = 55 nm) | — | — | — | — |
|  |  | B5 (Tg = 64.1° C., D50 = 97 nm) | — | — | — | — |
| ORGANIC SOLVENT | 2-PYRROLIDONE |  | 5.0 | 5.0 | 5.0 | 5.0 |
|  | 1,2- PROPANEDIOL |  | 9.0 | 4.0 | 9.0 | 9.0 |
|  | 1,2- BUTANEDIOL |  | — | — | — | — |
|  | 1,3- BUTANEDIOL |  | 4.0 | 9.0 | 4.0 | 4.0 |
|  | 1,3- PROPANEDIOL |  | — | — | — | — |
|  | 1,5- PENTANEDIOL |  | — | — | — | — |
|  | 1,2- HEXANEDIOL |  | 2.0 | 2.0 | 2.0 | 2.0 |
|  | GLYCERIN |  | — | — | — | — |

TABLE 3-continued

| | | | | | |
|---|---|---|---|---|---|
| SURFACTANT | BYK348 | 1.0 | 1.0 | 1.0 | 1.0 |
| WAX | AQ515 | 0.5 | 0.5 | 0.5 | 0.5 |
| WATER | PURE WATER | BALANCE | BALANCE | BALANCE | BALANCE |
| | TOTAL | 100 | 100 | 100 | 100 |
| | ORGANIC SOLVENT TOTAL (%) | 20 | 20 | 20 | 20 |
| | FIRST THICKENING PEAK TEMPERATURE (° C.) | 50 | 52 | 69 | 78 |
| | LOGARITHMIC ATTENUATION AT FIRST THICKENING PEAK | 0.9 | 0.4 | 0.5 | 0.5 |
| | MAXIMUM THICKENING PEAK TEMPERATURE (° C.) | 85 | 85 | 98 | 101 |
| | LOGARITHMIC ATTENUATION AT MAXIMUM THICKENING PEAK | 2.0 | 2.0 | 2.3 | 2.7 |

| | | | M20 | M21 | M22 |
|---|---|---|---|---|---|
| PIGMENT | | PIGMENT PR122 (D50 = 97 nm) | 4.0 | 4.0 | 4.0 |
| | | PIGMENT PR122 (D50 = 53 nm) | — | — | — |
| RESIN | DISPERSION RESIN | A1 (Tg = 107.8° C.) | 1.0 | 1.0 | 1.0 |
| | | A2 (Tg = 102° C.) | — | — | — |
| | | A3 (Tg = 74.4° C.) | — | — | — |
| | FIXING RESIN | B1 (Tg = 62.4° C., D50 = 54 nm) | 2.0 | 2.0 | 2.0 |
| | | B2 (Tg = 64.1° C., D50 = 58 nm) | — | — | — |
| | | B3 (Tg = 63.6° C., D50 = 56 nm) | — | — | — |
| | | B4 (Tg = 41.6° C., D50 = 55 nm) | — | — | — |
| | | B5 (Tg = 64.1° C., D50 = 97 nm) | — | — | — |
| ORGANIC SOLVENT | 2-PYRROLIDONE | | 5.0 | 5.0 | 5.0 |
| | 1,2- PROPANEDIOL | | — | 9.0 | 9.0 |
| | 1,2- BUTANEDIOL | | 9.0 | — | — |
| | 1,3- BUTANEDIOL | | 4.0 | — | — |
| | 1,3- PROPANEDIOL | | — | 4.0 | — |
| | 1,5- PENTANEDIOL | | — | — | 4.0 |
| | 1,2- HEXANEDIOL | | 2.0 | 2.0 | 2.0 |
| | GLYCERIN | | — | — | — |
| SURFACTANT | BYK348 | | 1.0 | 1.0 | 1.0 |
| WAX | AQ515 | | 0.5 | 0.5 | 0.5 |
| WATER | PURE WATER | | BALANCE | BALANCE | BALANCE |
| | TOTAL | | 100 | 100 | 100 |
| | ORGANIC SOLVENT TOTAL (%) | | 20 | 20 | 20 |
| | FIRST THICKENING PEAK TEMPERATURE (° C.) | | 53 | 52 | 48 |
| | LOGARITHMIC ATTENUATION AT FIRST THICKENING PEAK | | 0.2 | 0.6 | 0.4 |
| | MAXIMUM THICKENING PEAK TEMPERATURE (° C.) | | 90 | 86 | 85 |
| | LOGARITHMIC ATTENUATION AT MAXIMUM THICKENING PEAK | | 1.4 | 2.1 | 1.9 |

In the tables, the components represented by abbreviations and trade names are as shown below. In addition, in Tables 2 and 3, a total content of organic solvents is shown.

PR122: two grades of C.I. Pigment Red 122 having different D50s were prepared. The D50 was measured in a manner similar to that of the fixing resin, and the values thereof are shown in Tables 2 and 3.

BYK-348: silicone-based surfactant manufactured by BYK Japan KK.

AQ515: AQUACER 515 (wax, 2-pyrrolidone (SP value: 11.5)) manufactured by BYK Japan KK.

1,2-propanediol (SP value: 14.2)
1,2-butanediol (SP value: 13.1)
1,3-butanediol (SP value: 13.6)
1,3-propanediol (SP value: 15.5)
1,5-pentanediol (SP value: 13.5)
1,2-hyexanediol (SP value: 12.1)
glycerin (SP value: 16.7)

2.4. Evaluation Method

2.4.1. Rigid-Body Pendulum Characteristics Test

A rigid-body pendulum characteristics test was performed on each ink composition as described below, and a first thickening peak temperature (° C.), logarithmic attenuation at the first thickening peak, a maximum thickening peak temperature (° C.), and logarithmic attenuation at the maximum thickening peak are shown in Tables 2 and 3.

A tester "RPT-3000W" (manufactured by A&D Company, Limited) was used for the rigid-body pendulum characteristics test, "FRB-100 (manufactured by A&D Company, Limited)" was used as a rigid-body pendulum frame, and as a measuring section shape, "RBP020" was used. On the frame, 4 spacers (2.7 g/spacer) were disposed, and when the pendulum was swung at a swing angle of 0.3°, the change in free oscillation of the pendulum was measured while the temperature was increased. At ordinary temperature and ordinary humidity (at 22.0° C. to 25.0° C. and preferably 22.0° C. to 24.0° C. and at 35.0% RH to 60.0% RH and preferably 40.0% RH to 55.0% RH), 4 µL of the ink composition was dripped on a glass plate (24 mm×40 mm) (manufactured by Matsunami Glass Ind., Ltd.) and was used as a test sample. In addition, the measurement was performed under the conditions in which CHB-100 was used as a sample mount, a measurement interval was 6 seconds, a pendulum adsorption interval was 2 seconds, the temperature was increased from 30° C. to 170° C. at a rate of 2° C./minute, and a temperature increase time from ordinary temperature to 30° C. was 1 minute. In addition, the displacement of the pendulum was measured by continuously measuring a front end of the pendulum using a displacement sensor.

The measurement of each ink composition was performed as described above, so that a chart of logarithmic attenuation with temperature was obtained. In addition, a peak observed at the lowest temperature side was regarded as the first thickening peak, a peak having the largest logarithmic attenuation was regarded as the maximum thickening peak, and the temperatures and the logarithmic attenuations thereof were recorded.

2.4.2. Recording Test

A modified machine of an ink jet printer (trade name: SC-40650) was used. A nozzle density of a nozzle line was 360 dpi, and the number of nozzles was 360. By controlling a platen heater, a primary heating temperature (surface temperature of a recording medium when the ink composition was adhered) shown in Table 4 was obtained. In addition, during the ink adhesion, ventilation was performed at a platen with an ordinary temperature wind (25° C.) at a wind velocity of 5 m/s. In the example in which the primary heating temperature was 25° C., the primary heating step was not performed without using the platen heater.

By a secondary heater (post-heating heater) disposed downstream of the recording medium, a secondary heating temperature (surface temperature of the recording medium) was set to 75° C.

An adhesion amount of the ink composition to the recording medium was set to 7 mg/inch$^2$. As the recording medium, a PET 50A (polyester film label) manufactured by Lintec Corporation was used.

2.4.3. Number of Main Scannings

The number of main scannings performed on a band region having a length equivalent to the distance of one sub-scanning is shown in Table 4. When the number of main scannings was 4, that is, when four passes were performed, the distance of one sub-scanning is equivalent to one fourth of the length of the nozzle line to be used for recording. In the recording test described above, bidirectional printing was performed, and a pattern having a lateral width of 20 cm and a length of 50 cm was recorded on the recording medium.

2.4.4. Recording Rate

A recording rate of each example was evaluated by the following criteria, and the result thereof is shown in Table 4. When the number of main scannings is 4, that is, when 4 passes were performed, a time required therefor was regarded as 100%.

A: 70% or less of the time required for the above recording test.

B: more than 70% to 130% of the time required for the above recording test.

C: more than 130% of the time required for the above recording test.

2.4.5. Evaluation of Image Quality

A recorded matter formed by the recording test was observed by visual inspection and then evaluated by the following criteria, and the result thereof is shown in Table 4.

A: density irregularity is hardly observed in pattern.

B: fine density irregularity is slightly observed.

C: fine density irregularity is considerably observed.

D: apparent density irregularity is observed.

2.4.6. Evaluation of Ejection Stability

Under the conditions of the recording test, a simulation test was continuously performed for 1 hour without ejecting the ink composition from the nozzle. Subsequently, suction cleaning was performed. By one suction cleaning, 2 g of the ink composition was sucked from one head. Evaluation was performed by the following criteria, and the result thereof is shown in Table 4.

A: all nozzles are recovered by one suction cleaning, or no defective nozzles are present.

B: all nozzles are not recovered by one suction cleaning, but all nozzles are recovered by suction cleaning performed 3 times or less.

C: all nozzles are not recovered even by suction cleaning performed 3 times.

TABLE 4

| | EXAMPLE | | | | | |
|---|---|---|---|---|---|---|
| | EXAMPLE 1 | EXAMPLE 2 | EXAMPLE 3 | EXAMPLE 4 | EXAMPLE 5 | EXAMPLE 6 |
| INK COMPOSITION | M1 | M2 | M3 | M4 | M5 | M6 |
| NUMBER OF MAIN SCANNINGS | 4 | 4 | 4 | 4 | 4 | 4 |
| PRIMARY HEATING TEMPERATURE (° C.) | 45 | 45 | 45 | 45 | 45 | 45 |
| VENTILATION | YES | YES | YES | YES | YES | YES |
| IMAGE QUALITY | A | B | C | A | A | A |
| EJECTION STABILITY | C | B | A | C | B | C |
| WET ABRASION RESISTANCE | A | A | B | B | A | A |
| RECORDING RATE | B | B | B | B | B | B |

| | EXAMPLE | | | |
|---|---|---|---|---|
| | EXAMPLE 8 | EXAMPLE 9 | EXAMPLE 10 | EXAMPLE 11 |
| INK COMPOSITION | M8 | M9 | M10 | M11 |
| NUMBER OF MAIN SCANNINGS | 4 | 4 | 4 | 4 |
| PRIMARY HEATING TEMPERATURE (° C.) | 45 | 45 | 45 | 45 |
| VENTILATION | YES | YES | YES | YES |
| IMAGE QUALITY | C | A | C | B |
| EJECTION STABILITY | A | C | A | A |
| WET ABRASION RESISTANCE | C | A | C | C |
| RECORDING RATE | B | B | B | B |

TABLE 4-continued

| | EXAMPLE 12 | EXAMPLE 13 | EXAMPLE 14 | EXAMPLE 15 | EXAMPLE 16 | EXAMPLE 17 |
|---|---|---|---|---|---|---|
| INK COMPOSITION | M12 | M13 | M14 | M15 | M16 | M17 |
| NUMBER OF MAIN SCANNINGS | 4 | 4 | 4 | 4 | 4 | 4 |
| PRIMARY HEATING TEMPERATURE (° C.) | 45 | 45 | 45 | 45 | 45 | 45 |
| VENTILATION | YES | YES | YES | YES | YES | YES |
| IMAGE QUALITY | B | B | B | A | A | C |
| EJECTION STABILITY | C | C | A | B | C | C |
| WET ABRASION RESISTANCE | A | B | B | A | A | A |
| RECORDING RATE | B | B | B | B | B | B |

| | EXAMPLE 18 | EXAMPLE 19 | EXAMPLE 20 | EXAMPLE 21 | EXAMPLE 22 |
|---|---|---|---|---|---|
| INK COMPOSITION | M2 | M2 | M2 | M2 | M20 |
| NUMBER OF MAIN SCANNINGS | 2 | 4 | 4 | 4 | 4 |
| PRIMARY HEATING TEMPERATURE (° C.) | 45 | 50 | 40 | 45 | 45 |
| VENTILATION | YES | YES | YES | NO | YES |
| IMAGE QUALITY | C | A | C | C | A |
| EJECTION STABILITY | B | C | A | A | C |
| WET ABRASION RESISTANCE | A | A | A | A | B |
| RECORDING RATE | A | B | B | B | B |

| | EXAMPLE 23 | EXAMPLE 24 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| INK COMPOSITION | M21 | M22 | M18 | M19 | M2 | M1 |
| NUMBER OF MAIN SCANNINGS | 4 | 4 | 4 | 4 | 4 | 6 |
| PRIMARY HEATING TEMPERATURE (° C.) | 45 | 45 | 45 | 45 | 25 | 45 |
| VENTILATION | YES | YES | YES | YES | YES | YES |
| IMAGE QUALITY | B | A | D | D | D | A |
| EJECTION STABILITY | B | C | A | A | A | C |
| WET ABRASION RESISTANCE | A | A | B | C | A | A |
| RECORDING RATE | B | B | B | B | B | C |

| | COMPARATIVE EXAMPLE 5 | COMPARATIVE EXAMPLE 6 | COMPARATIVE EXAMPLE 7 | COMPARATIVE EXAMPLE 8 |
|---|---|---|---|---|
| INK COMPOSITION | M2 | M3 | M18 | M19 |
| NUMBER OF MAIN SCANNINGS | 6 | 6 | 6 | 6 |
| PRIMARY HEATING TEMPERATURE (° C.) | 45 | 45 | 45 | 45 |
| VENTILATION | YES | YES | YES | YES |
| IMAGE QUALITY | A | A | C | D |
| EJECTION STABILITY | B | A | A | A |
| WET ABRASION RESISTANCE | A | B | B | C |
| RECORDING RATE | C | C | C | C |

2.5. Evaluation Result

In the examples in each of which in the recording method which ejects the ink composition from the ink jet head to be adhered to the heated recording medium, the number of the main scannings performed on the same recording region of the recording medium is 5 or less, the temperature of the first thickening peak of the ink composition thus used is 30° C. to 65° C., and the temperature of the maximum thickening peak thereof is 70° C. or more, it is found that even when the recording rate is high, an image having a high image quality can be obtained.

On the other hand, in Comparative Examples 1 and 2 in each of which the temperature of the first thickening peak of the ink composition thus used is not 30° C. to 65° C., the image quality is inferior.

In addition, in Comparative Example 3 in which the primary heating step is not performed, the image quality is inferior.

In addition, in Comparative Examples 4 to 8 in each of which the number of the main scannings is not 5 or less, the recording rate is inferior.

In addition, in Comparative Example 7, although the temperature of the first thickening peak of the ink composition thus used is not 30° C. to 65° C., the image quality is not inferior. From this result, it is found that when the ink composition in which the temperature of the first thickening peak is not 30° C. to 65° C. is used, and when the number of the main scannings is 5 or less, the image quality is inferior.

The above embodiments and modified examples are described by way of example, and the present disclosure is not limited thereto. For example, the embodiments and the modified examples may be appropriately used in combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions are obtained.

A recording method of the present disclosure comprises: an adhesion step of ejecting an ink composition from an ink jet head to be adhered to a recording medium; and a primary heating step of heating the adhered ink composition, and the adhesion step includes at least one main scanning in which while a relative position of the ink jet head and the recording medium is changed in a main scanning direction, the ink composition is adhered to the recording medium and at least one sub-scanning in which the relative position of the ink jet head and the recording medium is changed in a sub-scanning direction. In the recording method described above, the number of the main scannings performed on the same recording region of the recording medium is 5 or less, the ink composition is a water-based ink containing a pigment, a resin, and an organic solvent, and in a chart of logarithmic attenuation with temperature obtained by measurement of the ink composition using a rigid-body pendulum characteristics test, the ink composition has a temperature of a first thickening peak of 30° C. to 65° C. and a temperature of a maximum thickening peak of 70° C. or more.

According to the recording method described above, since the ink composition having a first thickening peak temperature of 30° C. to 65° C. is used, the spread and the transfer of the ink composition when the ink composition is adhered to the heated recording medium are suppressed. Accordingly, even when the number of ink droplets to be adhered to the recording medium by one main scanning is increased, for example, the blurring of the image can be suppressed. Hence, even if the number of the main scannings is 5 or less, an image having a high quality is likely to be obtained. In addition, since the number of the main scannings can be decreased, the recording rate of the image can be increased. Furthermore, since the ink composition having a maximum thickening peak temperature of 70° C. or more is used, a film of the resin can be formed on the recording medium at a higher temperature, and hence, the abrasion resistance of the image is also improved.

In the recording method described above, the first thickening peak temperature may be 40° C. to 50° C.

According to the recording method described above, an image having a higher quality can be more rapidly recorded.

In the recording method described above, the logarithmic attenuation at the first thickening peak may be 0.2 or more, and the logarithmic attenuation at the maximum thickening peak may be 1.0 or more.

According to the recording method described above, an image having more preferable image quality and abrasion resistance can be recorded.

In the recording method described above, when the ink composition is adhered, the recording medium may have a surface temperature of 30° C. to 50° C.

According to the recording method described above, the recording can be performed at a higher rate.

In the recording method described above, the ink composition may contain at least a fixing resin as the resin, and the fixing resin may have a glass transition temperature of 50° C. or more.

According to the recording method described above, the maximum thickening peak temperature can be further increased, and an image having a more preferable friction fastness can be recorded.

In the recording method described above, the ink composition may contain at least a fixing resin as the resin, the fixing resin may be in the form of particles, and the particles of the fixing resin may have a volume average particle diameter of 100 nm or less.

According to the recording method described above, the logarithmic attenuations at the first thickening peak and the maximum thickening peak can be increased, and the recording can be performed with a more excellent ejection stability.

In the recording method described above, the ink composition may contain at least a fixing resin as the resin, and a content of the fixing resin in the ink composition may be 10 percent by mass or less.

According to the recording method described above, an image having a more excellent friction fastness can be recorded.

In the recording method described above, a content of the organic solvent in the ink composition may be 30 percent by mass or less.

According to the recording method described above, while the ejection stability is improved, the wet abrasion resistance can be improved.

In the recording method described above, the ink composition may contain, as the organic solvent, no nitrogen-containing solvent in an amount of more than 5 percent by mass.

According to the recording method described above, while the ejection stability is improved, the wet abrasion resistance can be improved.

In the recording method described above, the ink composition may contain, as the organic solvent, a 1,2-alkanediol having 4 carbon atoms or less and an alkanediol which has 8 carbon atoms or less and which is other than a 1,2-alkanediol.

According to the recording method described above, while the ejection stability is improved, the wet abrasion resistance can be improved.

In the recording method described above, the pigment contained in the ink composition may have a volume average particle diameter (D50) of 40 nm or more.

According to the recording method described above, the logarithmic attenuation at the first thickening peak can be increased, and the ejection stability can be further improved.

The recording method described above may further comprise, after the ink composition is adhered to the recording medium, a secondary heating step of heating a recorded matter.

According to the recording method described above, an image having a more excellent friction fastness can be obtained.

In the recording method described above, the recording medium may be a low-absorbing recording medium or a non-absorbing recording medium.

According to the recording method described above, a high quality image can be obtained, and in addition, a rapid recording rate can be more significantly advantageous.

An ink jet recording apparatus of the present disclosure performs recording by the recording method described above and comprises: an ink composition; an ink jet head to eject the ink composition; and a primary heating mechanism to heat the ink composition adhered to the recording medium. In the ink jet recording apparatus described above, the ink composition is an ink composition containing a pigment, a resin, and an organic solvent, and in a chart of logarithmic attenuation with temperature obtained by measurement of the ink composition using a rigid-body pendulum characteristics test, the ink composition has a first thickening peak temperature of 30° C. to 65° C. and a maximum thickening peak temperature of 70° C. or more.

According to the ink jet recording apparatus described above, since the ink composition having a first thickening peak temperature of 30° C. to 65° C. is used, the spread and the transfer of the ink composition are suppressed when the ink composition is adhered to the heated recording medium. Accordingly, even when the number of ink droplets to be adhered to the recording medium by one main scanning is increased, for example, the blurring of the image can be suppressed. Hence, since the number of the main scannings can be decreased to 5 or less, the recording rate of the image is high. Furthermore, since the ink composition having a maximum thickening peak temperature of 70° C. or more is used, a film of the resin can be formed on the recording medium at a higher temperature, and hence, an image having a preferable abrasion resistance can be obtained.

What is claimed is:

1. A recording method comprising:
   an adhesion step where an ink composition is adhered to a recording medium; and
   a primary heating step of heating the adhered ink composition;
   wherein the adhesion step includes at least one main scanning in which a relative position of an ink jet head and the recording medium is changed in a main scanning direction; and the ink composition is ejected from the ink jet head to be adhered to the recording medium, and includes at least one sub-scanning in which the relative position of the ink jet head and the recording medium is changed in a sub-scanning direction that is orthogonal to the main scanning direction,
   a number of the main scannings performed on the same recording region of the recording medium is 5 or less,
   the ink composition is a water-based ink containing a pigment, a resin, and an organic solvent,
   a SP value (solubility parameter value) of the resin is lower than a SP value of the organic solvent, and the SP value of the organic solvent is 10.0 to 17.0, the SP values are SP values that are defined by the Hansen method,
   wherein if the organic solvent consists of two or more organic solvents, the SP value of the organic solvent is a weight average SP value, of SP values of all the organic solvents contained in the ink composition, that are weight averaged based on the masses thereof, assuming that a total of all the organic solvents contained in the ink composition is 100 parts by mass, and
   wherein if the resin consists of two or more resins, the SP value of the resin is a weight average SP value, of SP values of all the resins contained in the ink composition, that are weight averaged based on the masses thereof, assuming that a total of all the resins contained in the ink composition is 100 parts by mass,
   in a chart of logarithmic attenuation with temperature obtained by measurement of the ink composition using a rigid-body pendulum characteristics test, the ink composition has a temperature of a first thickening peak of 30° C. to 65° C. and a temperature of a maximum thickening peak of 70° C. or more,
   the logarithmic attenuation at the first thickening peak is 0.2 or more, and the logarithmic attenuation at the maximum thickening peak is 1.0 or more,
   the temperature of the first thickening peak represents a temperature at which particles of the resin of the water-based ink are gathered on the recording medium and thickening thereof is completed, and
   the temperature of the maximum thickening peak represents a temperature at which dissolution of the resin forming the particles is completed.

2. The recording method according to claim 1, wherein the temperature of the first thickening peak is 40° C. to 50° C.

3. The recording method according to claim 1, wherein the recording medium in the primary heating step has a surface temperature of 30° C. to 50° C.

4. The recording method according to claim 1, wherein the ink composition contains at least a fixing resin as the resin, and
   the fixing resin has a glass transition temperature of 50° C. or more.

5. The recording method according to claim 1, wherein the ink composition contains at least a fixing resin as the resin,
   the fixing resin is in the form of particles, and
   the particles of the fixing resin has a volume average particle diameter of 100 nm or less.

6. The recording method according to claim 1, wherein the ink composition contains at least a fixing resin as the resin, and
   a content of the fixing resin in the ink composition is 10 percent by mass or less.

7. The recording method according to claim 1, wherein a content of the organic solvent in the ink composition is 30 percent by mass or less.

8. The recording method according to claim 1, wherein the ink composition contains, as the organic solvent, no nitrogen-containing solvent in an amount of more than 5 percent by mass.

9. The recording method according to claim 1, wherein the ink composition contains, as the organic solvent, a 1,2-alkanediol having 4 carbon atoms or less and an alkanediol which has 8 carbon atoms or less and which is other than a 1,2-alkanediol.

10. The recording method according to claim 1, wherein the pigment contained in the ink composition has a volume average particle diameter (D50) of 40 nm or more.

11. The recording method according to claim 1, further comprising: after the ink composition is adhered to the recording medium, a secondary heating step of heating a recorded matter.

12. The recording method according to claim 1, wherein the recording medium is a low-absorbing recording medium or a non-absorbing recording medium.

13. An ink jet recording apparatus which performs recording by the recording method according to claim 1, the ink jet recording apparatus comprising:
 the ink composition:
 the ink jet head to eject the ink composition; and
 a primary heating mechanism to
 conduct the primary heating step.

* * * * *